United States Patent [19]

Rouvrais et al.

[11] Patent Number: 4,853,775

[45] Date of Patent: Aug. 1, 1989

[54] METHOD AND DEVICE TO ESTIMATE MOTION IN A SEQUENCE OF MOVING PICTURES

[75] Inventors: Bernard Rouvrais, Vezin Le Coquet; Michel Kerdranvat; Philippe Robert, both of Rennes, all of France

[73] Assignee: Thomson-CSF, Paris, France

[21] Appl. No.: 171,835

[22] Filed: Mar. 22, 1988

[30] Foreign Application Priority Data

Mar. 23, 1987 [FR] France ............................ 87 03991
Dec. 11, 1987 [FR] France ............................ 87 17289

[51] Int. Cl.⁴ .......................................... H04N 7/12
[52] U.S. Cl. .................................. 358/105; 358/136
[58] Field of Search ............... 358/105, 138, 136, 133, 358/137, 135

[56] References Cited

U.S. PATENT DOCUMENTS

| | | | |
|---|---|---|---|
| 4,232,338 | 11/1980 | Netravali et al. | 358/136 |
| 4,496,972 | 1/1985 | Lippmann et al. | 358/136 X |
| 4,677,476 | 6/1987 | Kondo | 358/105 |
| 4,710,809 | 12/1987 | Ries et al. | 358/105 X |
| 4,710,812 | 12/1987 | Murakami et al. | 358/136 |
| 4,769,826 | 9/1988 | Kubo et al. | 358/136 X |

OTHER PUBLICATIONS

IEEE ICASSP 85 Proceesings, Tampa, Fla., Mar. 26–29, 1985, vol. 1, pp. 347–350, IEEE, New York, U.S.; R. J. Moorhead et al.: "Motion-Compensated Interframe Coding", En entier.

IEEE Transactions on Communications, vol. COM-32, No. 8, Aug. 1984, pp. 954–968, IEEE, New York, U.S.; S. Sabri: "Movement Compensated Interframe Prediction for NTSC Color TV Signals", p. 958, colonne de gauche, ligne 26-p. 960, colonne de droite, ligne 9.

Proceedings of Eusipco-80, Lausanne, Sep. 16–18, 1980, pp. 143–148, Eurasip, North-Holland Publishing Co., Amsterdam, NL; A. N. Netravali et al., "Interframe Coding with Recursive Motion Estimation", p. 143, colonne de gauche, ligne 1-p. 145, colonne de droite, ligne 37.

Primary Examiner—James J. Groody
Assistant Examiner—Victor R. Kostak
Attorney, Agent, or Firm—Cushman, Darby & Cushman

[57] ABSTRACT

The method consists in estimating motion by performing a gradient algorithm which minimalizes the mean square deviation of local luminance variations of the present pel of the picture with the pel that is homologous with it in the prior picture, in initializing the execution of the algorithm by displacement values estimated along several directions within the close causal neighborhood of the present pel and in propagating each estimate in the scanning direction if the picture lines.

24 Claims, 14 Drawing Sheets

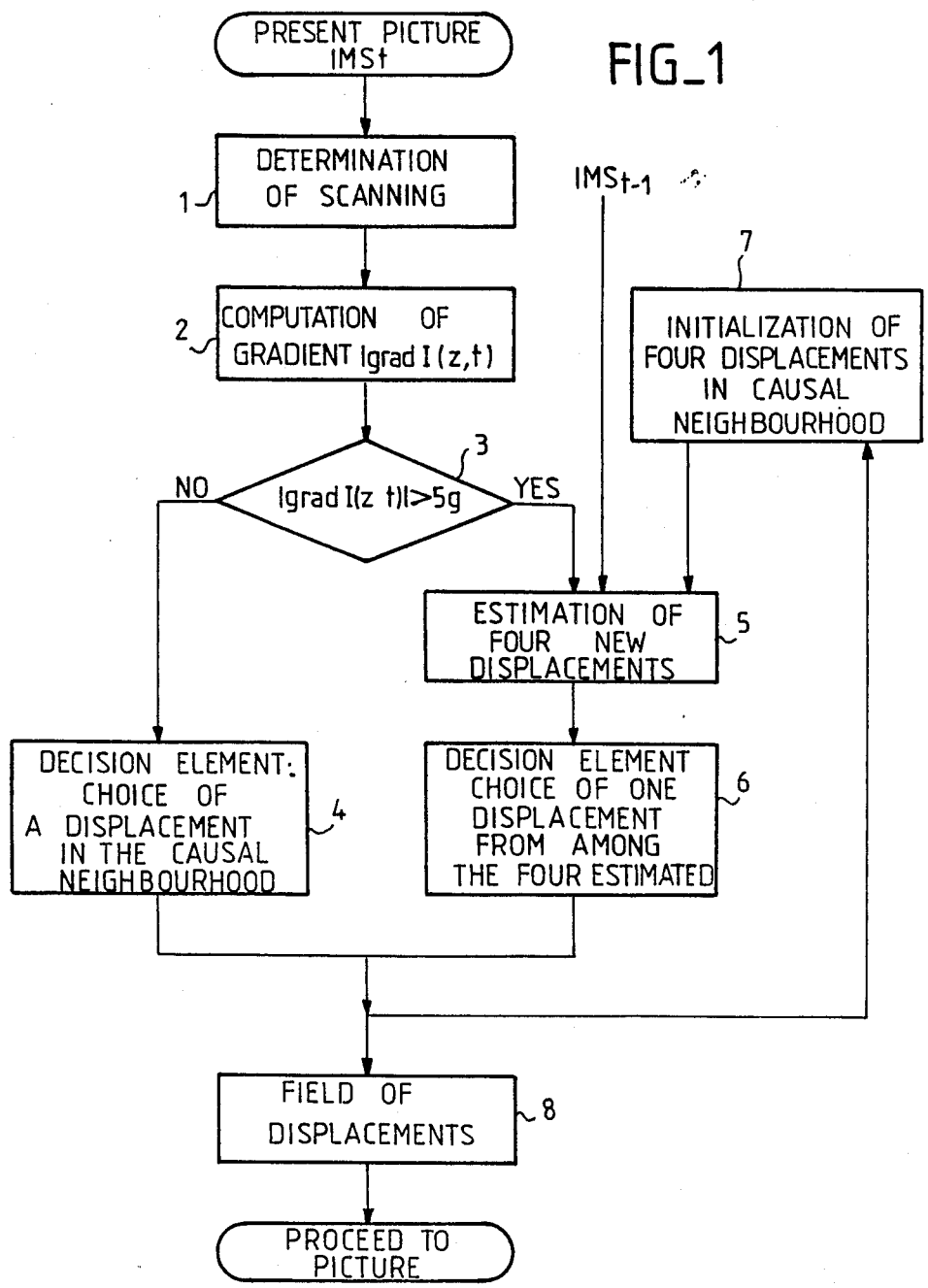

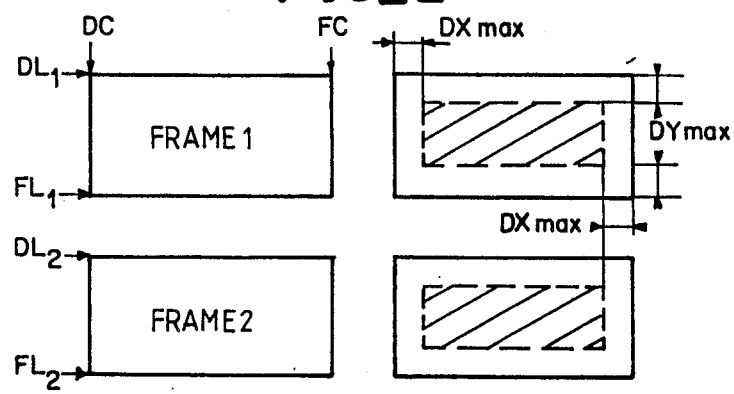
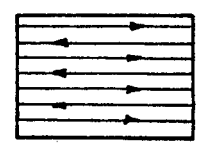
FIG_2  FIG_3A
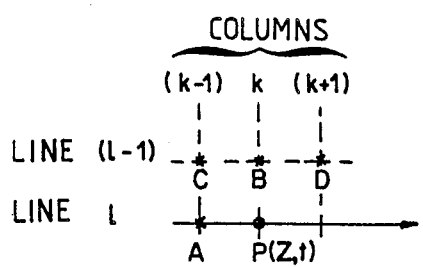
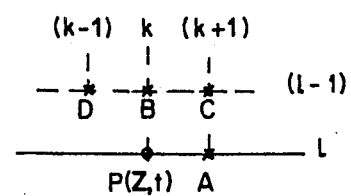
FIG_3B  FIG_3C
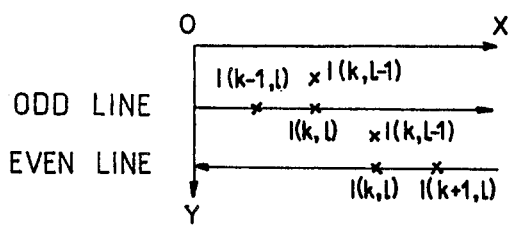
FIG_4
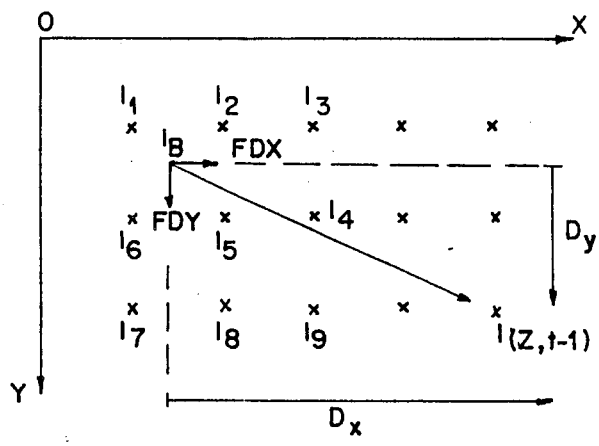
FIG_5

FIG_6
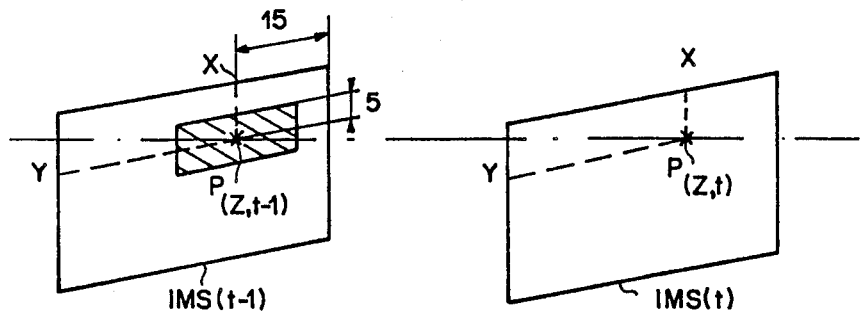
FIG_10A
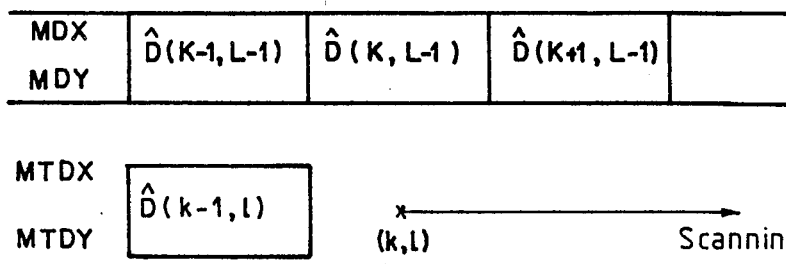
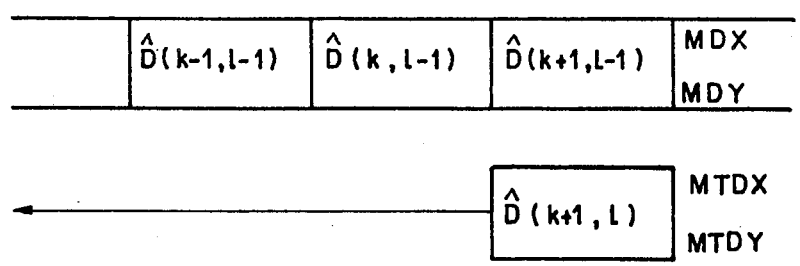
FIG_10B

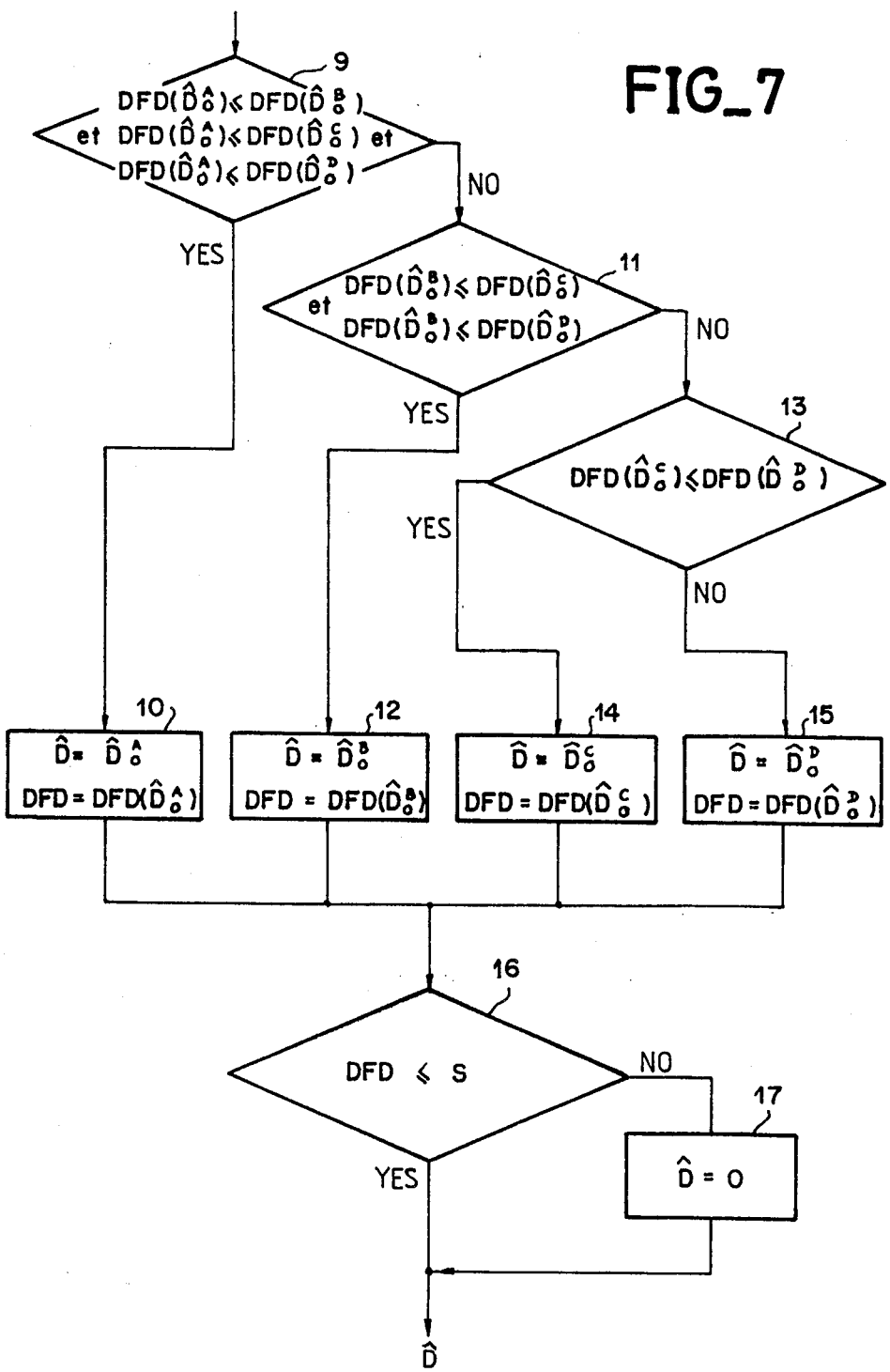
FIG_7

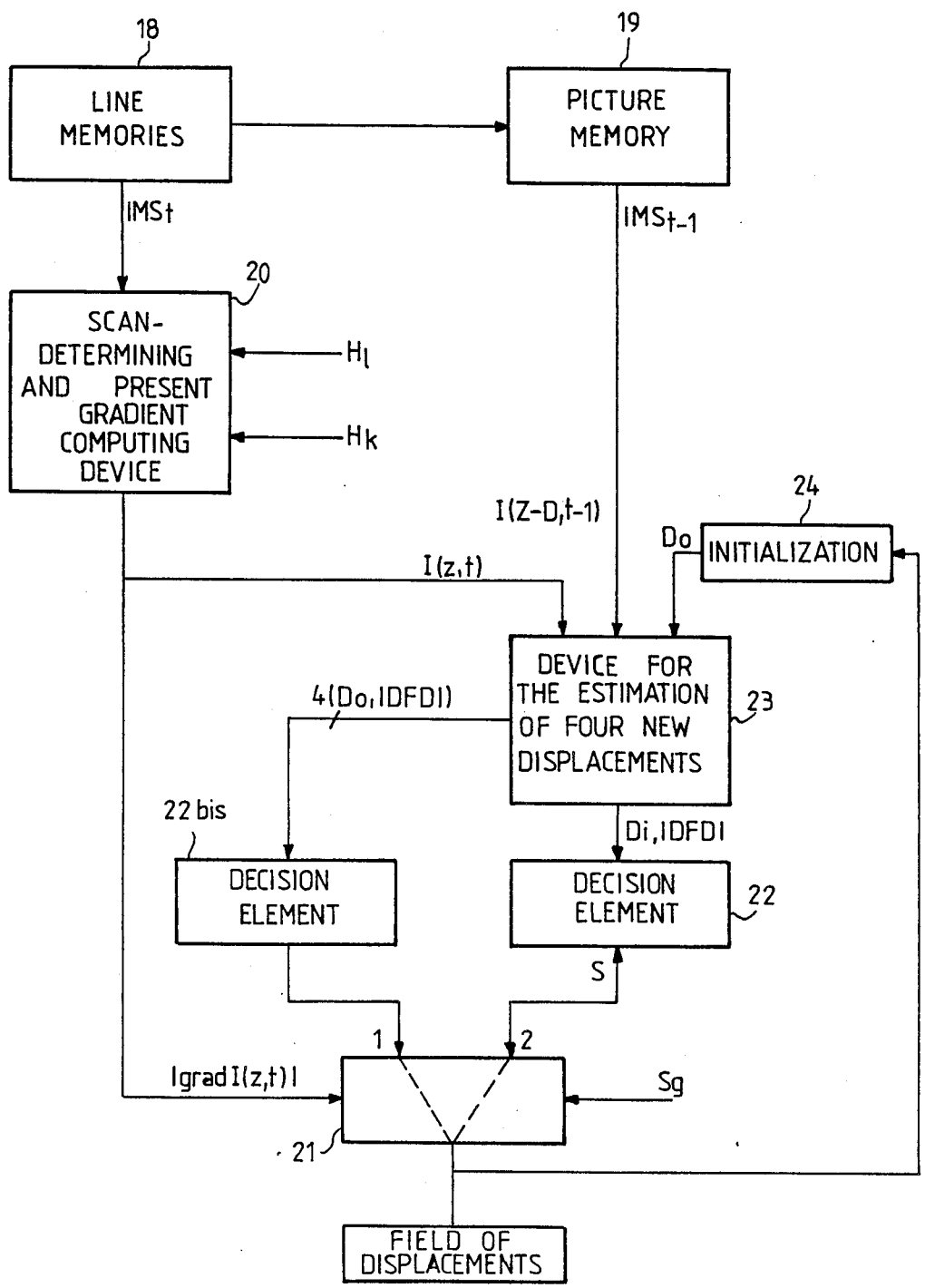

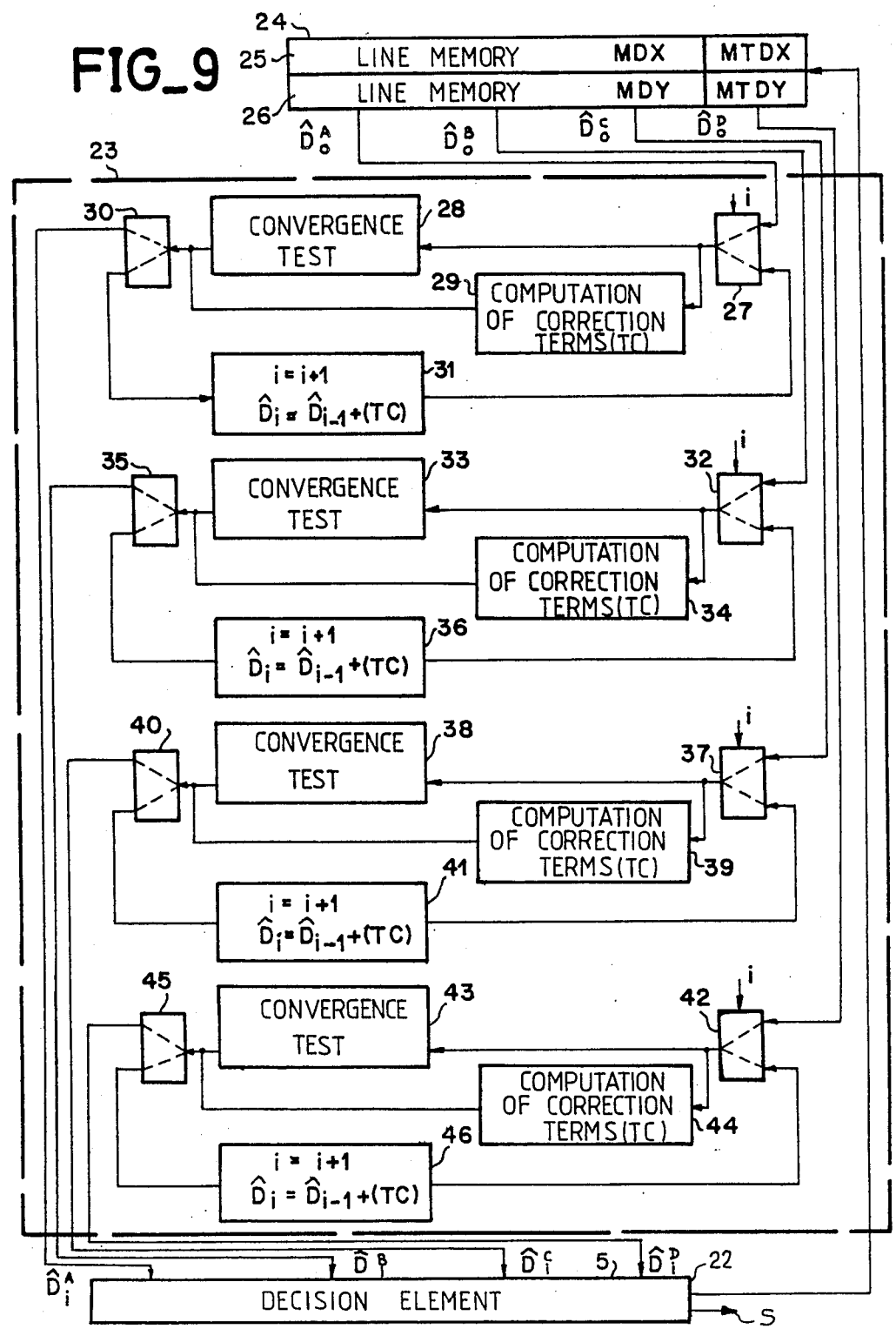
FIG_9

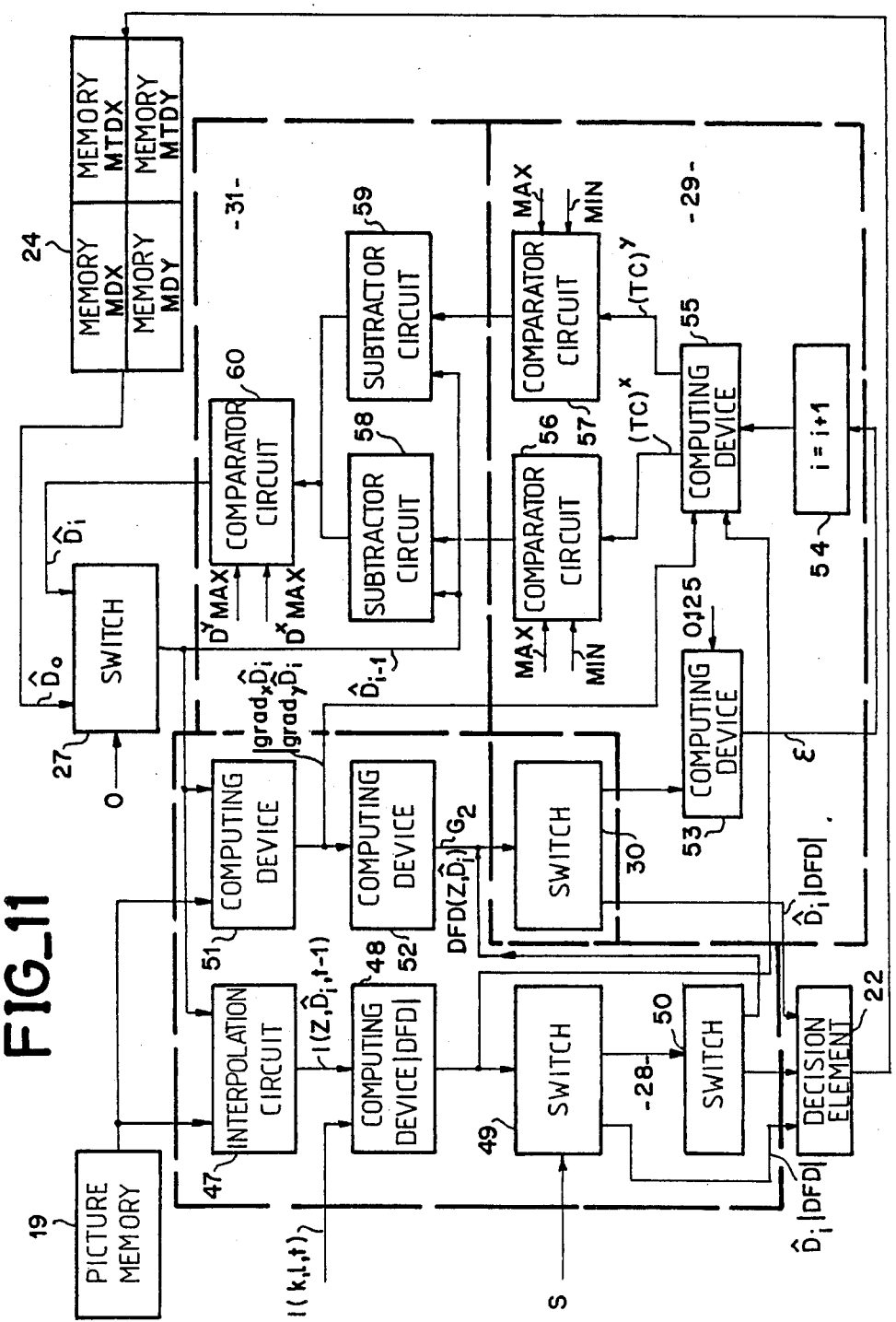
FIG_11

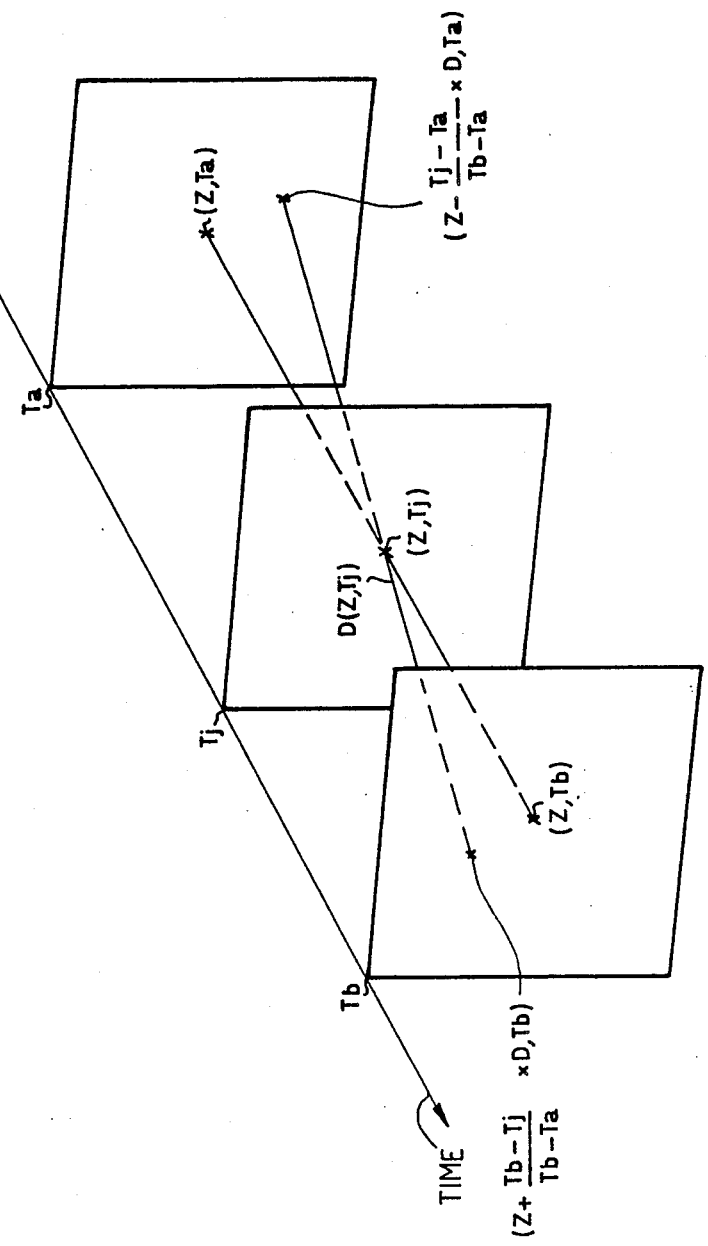
FIG_12

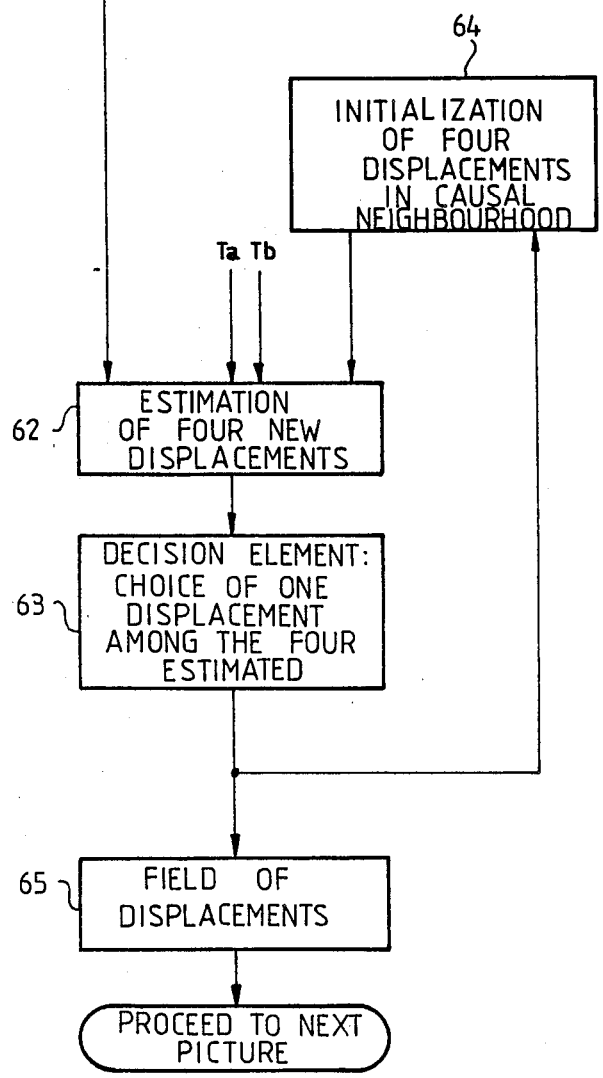

FIG. 14-A
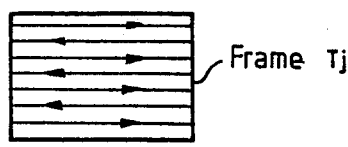
Frame Tj
FIG. 14-B
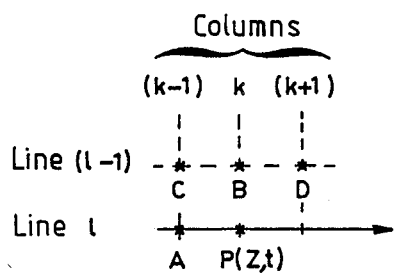
FIG. 14-C
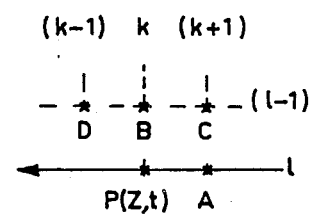
FIG. 15
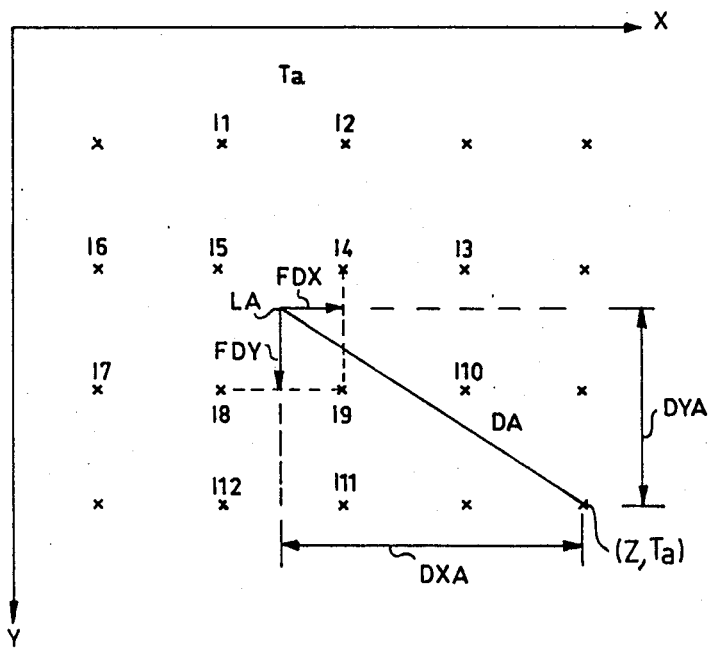

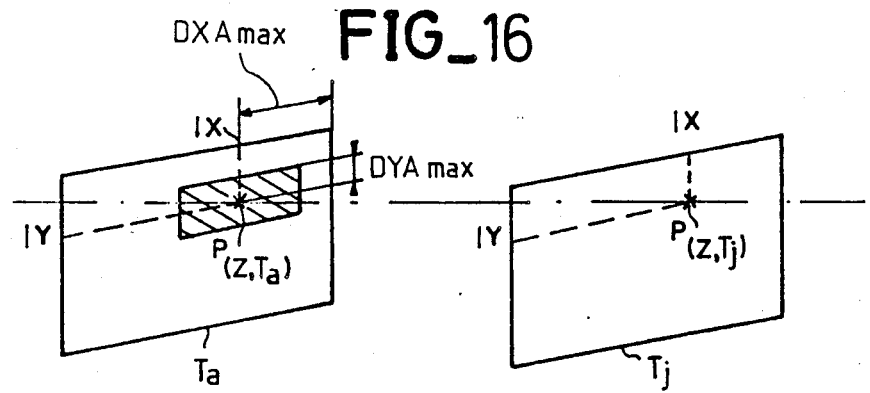
FIG_16
FIG_19-A
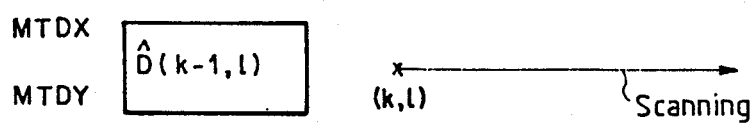
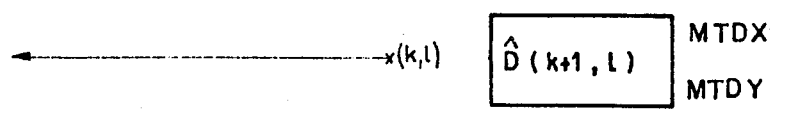
FIG_19-B

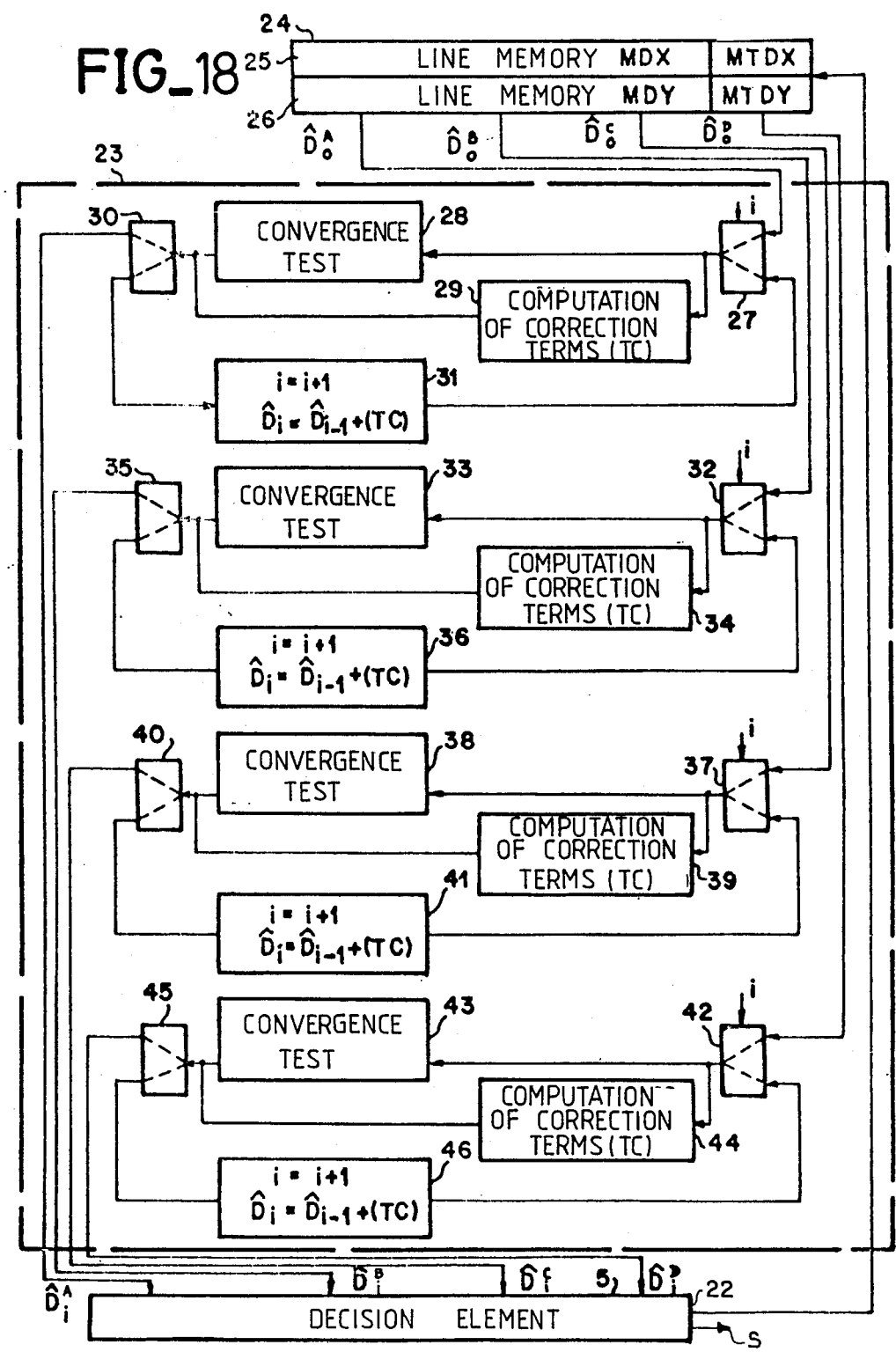

METHOD AND DEVICE TO ESTIMATE MOTION IN A SEQUENCE OF MOVING PICTURES

BACKGROUND OF THE INVENTION

1. Field of the Invention

The invention relates to a method and a device to estimate motion in a sequence of moving pictures.

Its applications include the making of digital television systems and the reduction of the data throughput in these systems.

2. Description of the Prior Art

According to known methods for estimating motion in a sequence of pictures, either the characteristic features of these pictures are made to correspond with one another or a differential estimating method is applied, using the spatial and temporal gradients of representative picture elements (pels or pixels). However, in the latter case, it is difficult to master the initializing of the gradient algorithms used. For example, according to a first known method, a few characteristic pels (angular elements, contours, etc.) are tracked temporally to estimate their motion and to initialize a gradient algorithm. However, in this case, before the tracking is done, it is absolutely necessary to resolve the problems of extracting angular picture elements and making them correspond with one another. This is a painstaking task and, as yet, gives very imperfect results.

According to a second known method, the mean square deviation of local variations in inter-picture (or possibly inter-frame) luminance are minimalized and the gradient algorithm is initialized by estimating the motion of the prior pel, i.e. the pel preceding the present pel on the same line. In this case, the convergence of the algorithm depends, to a great extent, on the initialization phase used, and this is generally done by taking the displacement to be that estimated for the pel preceding the present pel in the image scanning direction. However, to obtain valid results, the motion observed should be slow, there should be little variation in its characteristics between one pel and another in a scanned line, and it should be possible to favor one orientation and one direction of displacement. According to another alternative, the displacement estimated at the homologous pel in the prior image is still used. However, as above, this presupposes a small temporal variation in the motion and requires the use of a displacement image memory. Furthermore, problems arise in the zones where there are breaks (both spatial and temporal) in motion when these zones are formed by contours reflecting objects in motion.

SUMMARY OF THE INVENTION

The aim of the invention is to remove the above disadvantages.

To this end, an object of the invention is a method to estimate motion in a sequence of television type moving pictures, where each picture is formed by a determined number of light spots located at the intersections of lines and columns, a method of the type where motion is estimated by performing a gradient algorithm which minimalizes the mean square deviation between the local variations in luminance of the present pel of the picture and those of the pel which is homologous to it in the prior image, a method wherein the execution of the algorithm is initialized by displacement values estimated according to several directions within the close causal neighbourhood of the present pel and wherein each estimate is propagated in the picture lines scanning direction.

According to another alternative embodiment, the method according to the invention consists in determining a field of motion between two successive frames of a sequence of pictures in the form of a field of vectors assigned to a fictitious picture frame located in the vicinity of the two frames.

Another object of the invention is a device for the implementation of the above-mentioned method.

In associating several initial values in several displacement directions, the invention has the main advantage of making it possible to avoid having to detect the contours in motion and having to estimate their motion by placing them in correspondence with the contours of the previous picture by re-initializing the displacement algorithm at these contours. By choosing several possible directions of motion, even though all the directions of motion are not envisaged, a truer representation is obtained of the real displacement direction of the present pel.

Another advantage of the method and device of the invention is that they can be used to reconstitute luminance values of pixels of a missing frame in a sequence of pictures showing one and the same scene. Since each pixel has a motion vector, and is interpolated from known frames that surround it in the direction of the association motion vector, the reconstruction of the pixels of a missing frame is automatically adapted to the motion. The value of an interpolation of this type is that it can be used to convert a sequence of video pictures, with a frame frequency defined in one standard, into pictures according to another standard. It enables, for example, a conversion from a standard where the frame frequency is 50 Hz into another standard where the frame frequency is 60 Hz. In this case, since the instants of shooting at the 60 Hz frequency and at the 50 Hz frequency do not coincide, the method of the invention can be used, advantageously, to interpolate missing frames from available frames.

BRIEF DESCRIPTION OF THE DRAWINGS

Other characteristics and advantages of the invention will appear from the following description made with reference to the appended drawings, of which:

FIG. 1 is a flow chart describing the method according to the invention,

FIG. 2 shows the estimation and exploration zones,

FIGS 3a, 3b, and 3c show the direction in which the estimate of motion in a frame is propagated and the definition of the initial values for the odd-number and even-number lines respectively, FIG. 4 is a graph illustrating the method for computing the gradient of the present pel, FIG. 5 is a graph showing a displacement in a picture preceding the present picture, FIG. 6 is a representation of an exploration zone, FIG. 7 is a flow chart illustrating the decision algorithm used in the invention, FIG. 8 shows an embodiment of a device, according to the invention, for determining the gradient in a present picture, FIG. 9 is an embodiment of a four-path displacement estimating device according to the invention, FIGS. 10A and 10B show states of the initializing line memory in both scanning directions, FIG. 11 is a detailed block diagram of a path of the displacement estimating device according to the invention, FIG. 12 shows a method for estimating interframe motion by assigning a field of vectors to a fictitious frame, FIG. 13 is a flow chart illustrating the functioning of the motion estimating method corresponding to the illustration of FIG. 12, FIGS. 14A, 14B and 14C show the direction in which the estimate of motion in a frame is propagated, as implementation by the method illustrated in FIG. 13, FIG. 15 illustrates the computation of the displaced frame difference and the luminance gradient in an example of a fictitious frame, FIG. 16 shows the zone in which is located the end of the motion vector for a present pel (IX, IY, Tj) of a fictitious frame in a real frame, FIG. 18 shows a displacement vector estimating device for the implementation of the method illustrated in FIGS 12 to 16, FIGS 19A and 19B show an example of the memorizing of displacement vectors for prediction, in an example of the use of fictitious frames, according to the scanning direction.

DETAILED DESCRIPTION OF THE INVENTION

Figure 17:
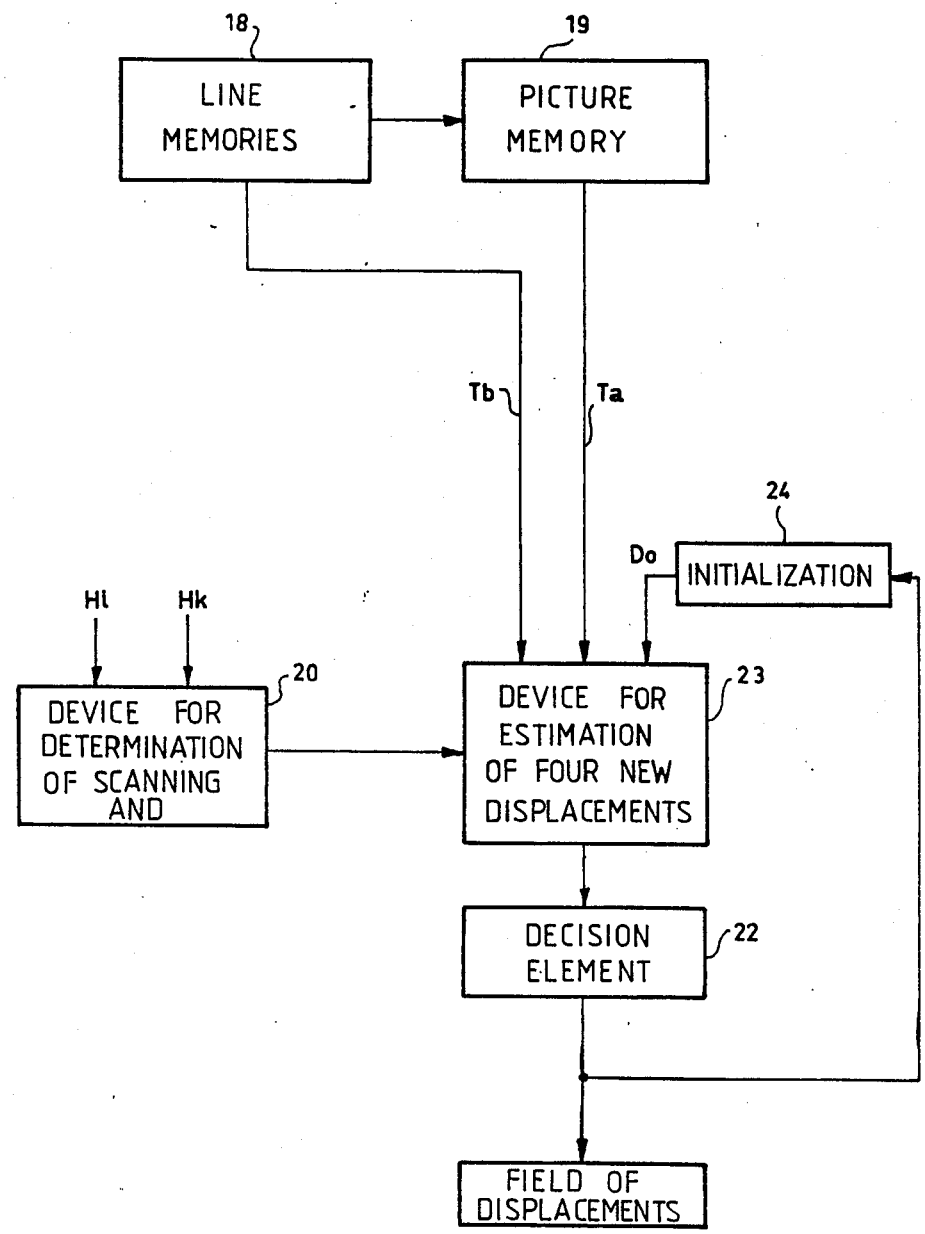
FIG. 17 shows a general organization of the motion estimating device corresponding to the method shown in FIGS. 12 to 16.

The method according to invention, which is described below, is based on the use of a displacement estimating algorithm of the type described in an article by A. N. NETRAVALI and J. D. ROBBINS, "Motion Compensated Television Coding", Part 1, in *Bell System Technology*, Vol. 58, pages 631 to 670, March 1979. The gradient algorithm developed in this article minimizes the mean square deviation of the local variations in luminance of each current pel of a television picture between the current pel and its homologous pel in the prior picture.

The expression of this algorithm is defined by a relationship having the form:

$$D_i(z,t) = D_{i-1}(z,t) - \epsilon \cdot DFD(z, D_{i-1}) \cdot \overrightarrow{\mathrm{grad}} \ I(z - D_{i-1}, t-T) \quad (1)$$

where z (x,y) designates the spatial coordinates of the current pel P(z,t), as a function of its position identified in the plane (x,y,) of the picture;

I(z,t) is the luminance of the present pel P(z,t) at the instant t;

$D_i(z,t)$ is the estimated displacement at the pel P(z,t) at the iteration i and DFD(z,D) designates the displaced frame, this difference verifying the relationship:

$$DFD(z,D) = I(z,t) - I(z-D, t-T) \quad (2)$$

T designates the picture interval and grad I(z,t) designates the gradient vector of the present pel P(z,t).

Epsilon designates the gain of the algorithm.

To improve the speed and convergence precision of the algorithm, epsilon is defined by the relationship:

$$\epsilon = \tfrac{1}{2} \cdot |\overrightarrow{\mathrm{grad}} \ I(z - D_{i-1}, t-1)|^2 \quad (3)$$

$$|\overrightarrow{\mathrm{grad}} \ I(z-D_{i-1}, t-1)|^2 = \overrightarrow{\mathrm{grad}}^2_x I(z-D_{i-1},t-1) + \overrightarrow{\mathrm{grad}}^2_y I(z-D_{i-1}, t-1) \quad (4)$$

on condition that if;

$$|\overrightarrow{\mathrm{grad}} \ I(z-D_{i-1},t-1)|^2 = 0, \text{ alors } \epsilon = 0 \quad (5)$$

The relationship (3) brings out the fact that the greater the increase in the gradient, the greater is the decrease in the correcting term for the estimated displacement at the previous iteration. To estimate the motion, the method of the invention uses the existing frame differences between two successive pictures $IMS_{t-1}$ and $IMS_t$ in a sequence of pictures, $IMS_t$ designating the picture at the instant t and $IMS_{t-1}$ designating the prior picture, with the time unit considered being the picture interval. The method is conducted in several steps which are shown schematically in the flow chart of FIG. 1. In a first step, shown at 1 in FIG. 1, each present or current picture IMS is analyzed on a pel-by-pel basis by scanning each line. The luminance gradient of each present pel with the coordinate z=(x,y) in the picture plane is calculated in the step 2 and its absolute value is compared at the step 3 with a determined threshold value Sg. If the value of the gradient found in step 3 is below the threshold Sg, step 4 of the method is performed. This step consists in choosing a displacement in the causal neighborhood of the current pel P(z,p). If, on the contrary, the value of the gradient found in step 3 is above the threshold Sg, the processing operations indicated in step 5 are performed, to estimate four new displacements from four initial values of displacement in the causal neighbourhood of the current pel. At the end of step 5, the method proceeds to step 6 where a displacement is chosen from among the four displacements estimated in step 5. The method thus proceeds by successive iterations: each ending of the execution of steps 4 or 6 causes the initialization of the following pel (step 7) and the displacements are recorded in the step 8.

The estimated displacement is limited in the picture, in lines and columns, to a rectangle of coordinates $\pm DX_{MAX}$ and $\pm DY_{MAX}$ with respect to the present pel. The zone for estimating motion in the present picture is limited to $DX_{MAX}$ and $DY_{MAX}$ (FIG. 2). The search for the displaced pel is made throughout the prior picture.

The picture consists of two interlaced frames, frame 1 and frame 2. In the analysis, frame 1 is taken at the instant t, and frame 2 at the instant t+T/2, T representing the picture interval. The motion is estimated according to an inter-picture mode, i.e. by comparing the frames 1 and the frames 2 of two successive pictures. If designates the number of lines included in a picture, the lines of frame 1 are numbered 1 to T/2 and those of the frame 2 are numbered T/2+1 to .

A representation of the corresponding estimation zones is shown in FIG. 2 in the form of a triangle for each of the frames 1 and 2 respectively of the present picture IMS(t) and the prior picture IMS(t−T). In this figure DC and FC respectively designate the first and last useful column of the picture, $DL_1$ and $FL_1$ respectively designate the first and last useful lines of the frame number 1, and $DL_2$ and $FL_2$ respectively designate the first and last useful lines of the frame number 2.

In designating the current pel, for which the motion is estimated, by P(k,l), the estimation zone $Z_1$ of the frame 1 is defined by the relationship:

$$Z_1: \{p(k,l)/K\epsilon[DC+DX_{MAX}, FC-DX_{MAX}] \text{ and}$$

$$l\epsilon[DL_1+DY_{MAX}, FL_1-DY_{MAX}]\} \quad (6)$$

and that of frame 2 is defined by the relationship:

$$Z_2: \{p(k,l)/K\epsilon[DC+DX_{MAX}, FC-DX_{MAX}] \text{ and}$$

$$l\epsilon[DL_2+DY_{MAX}, FL_2-DY_{MAX}]\} \quad (7)$$

The displacements which are estimated in the closest causal neighborhood of the current pel serve to initialize the motion estimating algorithm. This causal neighborhood contains four displacements which are used to initialize four estimates of motion in parallel.

The estimate is propagated, in the method, along the normal scanning direction for television pictures. However, to avoid favoring one propagation direction in the picture, for example left to right, the scanning direction is reversed alternately at every other line. This scanning in odd-numbered and even-numbered alternating lines is shown in FIG. 3a and the initial values $D_0^A$, $D_0^B$, $D_0^C$ and $D_0^D$ for the odd-numbered lines and the even-numbered lines are respectively shown in FIGS. 3A and 3B.

Following the representation of FIG. 4, the gradient in the present picture is computed at the present pel P(z,t) according to the scanning of the present line. Since this computation respects causality, it differs according to the scanning direction. For an odd-numbered line, the gradient verifies the relationship:

$$\text{grad}_x = I(k,l) - I(k,-1,l); \quad \text{grad}_y = I(k,l) - I(k,l-1) \quad (8)$$

for an even-numbered line, the gradient verifies the relationship:

$$\text{grad}_x = I(k+1,l) - I(k,l); \quad \text{grad}_y = I(k,l) - I(k,l-1) \quad (9)$$

$$\text{Avec } |\overrightarrow{\text{grad }} I(z,t)| = \sqrt{\text{grad}^2_x + \text{grad}^2_y} \quad (10)$$

Since the basic algorithm used is a gradient algorithm, no iteration (new estimate of displacement) is done in the low gradient zones. The threshold Sg is the threshold used on the modulus of the present gradient.

To interpolate and compute the gradients in the prior picture, each displacement $D=(D_x.D_y)$ is split up into its two components $D_x$ and $D_y$ according to the relationships:

$$D_x = ID_x + FD_x \text{ and } D_y = ID_y + FD_y,$$

where ID and FD respectively designate the whole and fractional parts of the displacements.

The unit of displacement in X is formed by the interval between two pels on the same line and the unit of displacement in Y consists of the interval between two lines in the same frame. As for the gradients, they are calculated according to the known method described in the article by S. SABRI, "Movement Compensated Inter-Frame Prediction for NTSC Color Television Signals" in IEEE TRANS, Vol. 32, No. 8, August 1984. representation of these computations in the form of a graph is given in FIG. 5 which shows displacements in the prior picture IMS (t−1).

The luminance $I_B$ of the present pel displaced in the prior picture is obtained by the bilinear interpolation of the luminances $I_n$ of the neighboring pels. This implies the following relationship with the notations of FIG. 5:

$$I_B = I_5.(1-FD_x).(1-FD_y) + I_6.FD_x.(1-FD_y)$$
$$+ I_2.(1-FD_x).FD_y + I_1.FD_x.FD_y \quad (11)$$

The horizontal gradient is:

$$I_x = (I_5 - I_6 + I_2 - I_1)/2 \quad (12)$$

The vertical gradient is:

$$I_y = (I_5 - I_2 + I_6 - I_1)/2 \quad (13)$$

$$\text{if } FD_x = 0: I_x = (I_4 - I_6 + I_3 - I_1)/4 \quad (14)$$

$$I_y = (I_5 - I_2) \quad (15)$$

$$\text{if } FD_y = 0 \; I_x = (I_5 - I_6) \quad (16)$$

$$I_y = (I_7 - I_1 + I_8 + I_2)/4$$

if $FD_x = 0$ et $FD_y = 0$ $$I_x = (I_4 - I_6 + I_3 - I_1)/4 \quad (18)$$

$$I_y = (I_7 - I_1 + I_8 - I_2)/4 \quad (19)$$

To limit the risks of their divergence or cancellation, the correcting terms are increased and decreased. We get $$D^x_i = D_{i-1}^x - (\text{correcting term})^x \quad (20)$$

$$D^y_i = D_{i-1}^x - (\text{correcting term})^y \quad (21)$$

$$(\text{correcting term})^x = \text{DFD}(z, D_{i-1}).\text{grad}_x I(z - D_{i-1}, t-1). \quad (22)$$

$$(\text{correcting term})^y = \text{DFD}(z, D_{i-1}).\text{grad}_y I(z - D_{i-1}, t-1). \quad (23)$$

By calculating the gradient in the prior picture with a maximum precision of 0.25, we get, by the relationship (3):

$$\text{epsilon}_{MAX} = 8 \quad (24)$$

In general $FD_x$ and $FD_y$ are different from zero and the maximum precision on the gradient is 0.5. We then get $\text{epsilon}_{MAX} = 2$.

According to a possible embodiment of the invention, tests for limiting the correcting terms expressed in units of displacement may be defined, if necessary, as follows:

1. If $|(\text{correcting term})| < 1/16$, then the (correcting term) will be taken to be equal to $\pm 1/16$.

2. If $|(\text{correcting term})^x| < 3$, then the (correcting term)$^x$ will be taken to be equal to $\pm 3$.

3. If $|(\text{correcting term})^y| < 2$, then the (correcting term)$^y$ will be taken to be equal to $\pm 2$.

Also in this embodiment, as an example, we could take $D^x_{MAX} = \pm 15$ as the maximum displacement in x and $D^y_{MAX} = \pm 5$ as the maximum displacement in y. If the estimated displacement exceeds either of these values, it is reset at zero.

Thus, the search zone in the IMS (t−1) frame for a present pel P(z,t) is defined in a rectangle with a dimension of 30×10 as shown in FIG. 6.

The four estimates of displacement are made in parallel, using the four initial values $D_0^A$, $D_0^B$, $D_0^C$ and $D_0^D$. A pel is considered to be convergent when at least one of the four displacement values $D_i^A$, $D_i^B$, $D_i^C$ and $D_i^D$ gives an absolute value of the displaced frame difference DFD($z,D_i$) below the above-defined threshold S for an iteration number i greater than or equal to zero (i=0 designating an initial value) and smaller than or equal to the maximum iteration number $I_{MAX}$ ($0 \leq i \leq$ $MAX$). If no displacement value gives a DFD value smaller than or equal to S, the pel is considered to be divergent but, all the same, it is assigned a displacement, namely that displacement among $D_{iMAX}^A$, $D_{iMAX}^B$, and $D_{iMAX}^C$, $D_{iMAX}^D$ which gives the lowest absolute value of DFD.

If the present picture gradient is low, a displacement is chosen in the causal neighbourhood of the present pel P(z,t) and no iteration is done (i−0). The criterion for decision then lies in choosing that displacement which, among the values $D_0^A$, $D_0^B$, $D_0^C$ and $D_0^D$, gives the lowest absolute value of the displaced frame difference DFD(z,D$_0$). In the event of equality, the choice is made in the order $D_0^A$, $D_0^B$, $D_0^C$ and $D_0^D$ (steps 9 to 13 of FIG. 7). However, if the displaced frame difference of the chosen displacements is not below or equal to the threshold S (step 16), the convergence test threshold, the displacement takes the value 0 (step 17).

If the present image gradient is high at each iteration (from 0 to $i_{MAX}$) four values of $|DFD(D_i)|$ are obtained, and these four values are compared with the threshold S.

The displacement retained is the first one that gives a $|DFD|$ which is below the threshold S or equal to it. If several displacements are obtained at the same iteration, the one that gives the lowest displaced frame difference $|DFD|$ is chosen. If there is equality again on $|DFD|$, an arbitrary choice is made in the following order: $D_i^A$, $D_i^B$, $D_i^C$ and $D_i^D$.

Thus, with each iteration $I(0 \leq i \leq i_{MAX})$, is associated a displacement $D_i$, a displaced frame difference DFD and an iteration number i.

The decision then is taken on the smallest number of iterations, and then on the minimum displaced frame difference DFD followed, if necessary, by an arbitrary choice.

An embodiment of a device corresponding to the method mentioned is shown in FIG. 8. It consists, for example, of line memories 18, a picture memory 19, a device 20 to compute the modulus of the present gradient, a switching device 21 as well as decision elements 22 and 22a and a displacement estimating element 23. The device for computing the present gradient modulus receives its data from all the line memories 18 and gives the result of the computations to the displacement estimating device 23 and the switching device 21. The displacement estimating device also has two inputs which are connected, firstly, to the output of all the line memories 18 and, secondly, to the output of the picture memory 19. The line memory 18 acts as a buffer to the picture memory 19 to store the refresh data for the picture memory 19 pending a stage when the analyzed pels will be outside the exploration window. With an exploration window occupying a space of ten lines, of the type described in FIG. 6, a line memory with a pel-storing capacity corresponding to five successive lines would appear to be sufficient. The computations are done at the pel frequency, at the rate of the clock pulses, $H_1$ and $H_k$, given by a line clock (not shown). The device 20 determines the present line number 1 and, depending on the parity of the present line number 1, it determines the current pel column number k. The device 20, which then has the coordinates (k,1) of the present pel available to it, computes the modulus of the present gradient. The switching device 21 compares the result of the computation given by the device 20 with a reference threshold Sg and, according to the algorithm shown in FIG. 1, validates its input 1 or 2. The input 1 is chosen if $|grad\ I(z,t)| \leq Sg$ and the input 2 is chosen if $|grad\ I(z,t)| > Sg$. The decision elements 22 and 22a have the functions described in the flow chart of FIG. 7 and can be made in a known way, either with a microprocessor-type microprogrammed structure or with a wired logic circuit made up, in a known way, of comparator circuits.

The displacement estimating device shown in FIG. 9 consists of an initializing block 24 consisting of registers 25 and 26 and a computing set 23 made up of the elements 27 to 46. This computing unit 23 gives the displacement data $D_i^A$, $D_i^B$, $D_i^C$, $D_i^D$ to the decision element 22. The input 2 of the switching device 21 (FIG. 8) is connected to the decision element 22. The initializing block 24 is used to initialize the displacement computing algorithm. The block 24 has a first register 25 and a second register 26. These registers consist of two distinct parts, one to store binary words representing the displacement mode in x or in y, respectively called MDX and MDY and the other to act as a buffer memory for the words representing the displacement modes MTDX and MTDY computed by the decision element 22.

Using the above notation, we get:

MDX=(FC−DC−2DX$_{MAX}$+3) displacements
MDY=(FC−TC−2DX$_{MAX}$+3) displacements
MTDX=1 displacement
MTDY=1 displacement.

At the start of each frame of pictures, all the words MDX, MDY, MTDX and MTDY are reset at zero. MTDX and MTDY are used as intermediaries before overlaying the words MDX and MDY, corresponding to the displacements D(k−1,1−1), for proceeding to the analysis of the following pel (k+1,1) as shown in FIG. 10A. They also serve as intermediaries before overlaying the words MDX and MDY corresponding to 048537757.002 the displacements D(k+1,1−1) for proceeding to the analysis of the following pel (k-1,1) as shown in FIG. 10B.

In the example of FIG. 10A, when k is equal to FC, the estimated displacement D(FC,1) is automatically put in the words (MTDX, MTDY) and, furthermore, in the words (MDX, MDY) corresponding to the displacements D(FC,1) and D(FC+1,1).

In the case of FIG. 10B, when k is equal to DC, the estimated displacement D(DC,1) is automatically put in the words (MTDX, MTDY) and, furthermore, in the words (MTX, MDY) corresponding to the displacements D(DC,1) and D(DC−1,1).

The displacement estimation computing device, consisting of the elements 27 to 46, does four parallel displacement computations from four initial values $D_O^A$, $D_O^B$, $D_O^C$, $D_O^D$ contained in the initializing block 24, when the spatial gradient of the present picture is above the threshold Sg defined above. The data $D_O^A$, $D_O^B$, $D_O^C$, and $D_O^D$ are respectively applied to the first inputs of the switching circuits 27, 32, 37 and 42, the outputs of which are connected to convergence-testing and correcting-term computing blocks respectively marked (28, 29), (33, 34), (38, 39), and (43, 44). The results of the convergence tests and of the computation of the correcting terms are applied to the inputs of switching devices, respectively marked 30, 35, 40 and 45 which then direct them either to respective inputs of the decision element 22 or to devices for computing new displacements, respectively marked 31, 36, 41 and 46, when the solution of the earlier-described algorithm deviates for i lower than $i_{MAX}$. The new displacements given by the computing devices 31, 36, 41 and 46 are respectively applied to the second inputs of switching devices 27, 32, 37 and 42.

The details of an embodiment of a convergence-testing block 28, associated with a correcting-term computing block 29 and a new displacement computing block 31, are shown in FIG. 11 within broken lines.

The convergence-testing block 28 includes, firstly, an interpolation circuit 47, coupled to a device 48 for computing the absolute value of the displaced frame difference |DFD|, this device 48 being coupled to the decision element 22 through switches 49, 50 and, secondly, a gradient-computing device 51, coupled to a device 52 for computing the sum of the squares of the displaced gradients. The interpolation circuit 47, which may, if necessary, consist of a programmable read-only memory, is also coupled to the picture memory 19. The correcting-terms computing block 29 has a computing device 53 to compute the above-described value epsilon, coupled to an increment-computing device 54 and a correction values computing device 55 as well as comparator circuits 56 and 57.

The new displacements computing block 31 has subtracting circuits 58 and 59, both coupled to a comparator circuit 60. The convergence-testing block 28 and the correcting-term computing block 29 are coupled, as in FIG. 9, by the switch 30. The input of the switch is directly coupled to the output of the computing device 52 and to the output of the computing device 48, through switches 49 and 50. Furthermore, as in FIG. 9, the initializing block 24 is coupled to the convergence-testing block 28 through the switch 27. This switch connects the initializing block 24, firstly, to a first input of the interpolation circuit 47 and, secondly, to a first input of the computing device 51. The second input of the switch 27 is also coupled to the output of the new displacement computing block 31, which consists of the comparator circuit 60.

The displacement estimating device works as follows. For each of the present pels of the picutre, the switch 27 transmits an initial value $D_O$, found in the register 24, to the interpolation circuit 47 and the gradient-computing device 51. The value $D_O$ initializes the estimation. A bilinear interpolation on the value $D_0$ is computed by the interpolation circuit 47 to determine the luminance of the present pel displaced in the prior picture $I(z-DO, t-1)$. The displaced frame difference $|DFD(Z,DO)|$ and its absolute value are computed by the computing device 48 using data on the luminance of the present pel. The switch 49 sends the value computed by the computing device 48 to the decision element 22 when the value obtained is smaller than or equal to the above-defined threshold S. The displacement $D_O$ and absolute value of the displaced frame difference $DFD(D_O)$ are applied to the inputs of the decision element. Otherwise, the result given by the computing device 48 is applied to the input of the switch 50 and then to the input of the decision element 22 when the iteration value i is equal to the maximum iteration value $i_{MAX}$. On the contrary, when the iteration value i is smaller than the maximum value, the result is applied to the inputs of the correction computing block 29 through the switch 30.

During these computing operations, which are performed during a time t from the instant t=0, the displaced gradients $grad_x$ and $grad_y$ and the term $G_2 = 2 \cdot (grad^2_x + grad^2_y)$ are computed.

Depending on the value of G2, the switch 30 sends the result obtained either towards the decision element 22, if the value of G2 obtained is smaller than or equal to a coefficient value of 0.125 for example, or to the computing block for correcting terms of new displacements 29 and 31.

The computing device 53 computes the value epsilon = $1/G_2$. The iteration value i is increased by one unit by the increment computing device 54 and is reset at zero for the analysis of the following present pel. The terms $(TC)^x$ and $(TC)^y$ for correction in X and Y are computed by the circuit 55. The values $(TC)^x$ and $(TC)^y$, obtained at the outputs of the computing device 55, verify the relationships:

$$(TC)^x = DFD(z,D_i) \times grad_x(D_i) \times \epsilon$$

and $$(TC)^y = DFD(z,D_i) \times grad_y(D_i) \times \epsilon$$

The values $(TC)^x$ and $(TC)^y$ obtained are respectively applied to the inputs of the comparators 56 and 57 to be limited (barring plus or minus signs) to maximum and minimum values. According to a preferred embodiment of the invention, the minimum values of $(TC)^x$ and $(TC)^y$ are the same and are fixed at 1/16. On the contrary, the maximum value of $(TC)^x$ is fixed so as to be equal to 3 and the maximum value of $(TC)^y$ is fixed so as to be equal to 2. The terms $(TC)^x$ and $(TC)^y$ obtained are added to the displacement values $D^x_O$ and $D_O^y$ by the circuits 58 and 59, and the results obtaind $D_1^x$ and $D_1^y$, which correspond to the estimated displacements, are again limited by the comparator circuit 60 before being applied to the second input of the switch 27. At the following iteration i(i=2), the switch 27 applies the estimated displacements $D_1^x$ and $D_1^y$ to the circuits 47, 51, 58 or 59.

At the output of the decision element 22, a displacement is chosen for the present pel and is written in the MTDX and MTDY buffer memory 24. i is reset at zero and the switch 27 returns to its starting position, and the computations described above are started again to estimate the displacement of the new present pel.

However, the above-described method and device according to the invention have the disadvantaage of being applicable only to the television standards for which they have been designed.

Thus, the luminance values of the pels of the missing frames, in a sequence of pictures representing one and the same scene, cannot be taken into account to determine the motion of the objects of the scene.

An alternative embodiment of the method according to the invention, which is described below, will remove this disadvantage, by enabling the determination of a field of motion between two generally successive frames in a sequence of pictures in the form of a field of vectors assigned to a fictitious frame generally located between two parent frames. The field of motion consists of a set of vectors. Each vector passes through a pel of the fictitious frame, and has its endpoints on the two parent frames on either side of it. In FIG. 12, the parent frames are designated by the instants Ta and Tb at which they were shot. The fictitious frame is located at an intermediate instant $t_j$ between the instants Ta and Tb. The purpose here is to give a displacement vector to each pel of the fictitious frame considered at the instant $T_j$ (the luminance of each pel being unknown in principle) from the luminance field of the frames of the instants Ta and Tb. According to another embodiment, it will also be possible to consider the instant $T_j$ as being also located outside the interval (Ta, Tb).

The method according to the invention is similar to the method described above with the difference, however, that it enables an estimation of motion between two frames at instants Ta or Tb for the pels of the fictitious frame Tj. The complexities of the algorithm and of the resulting estimating device are of the same magnitude.

The estimation of motion is computed from the luminance LO of the pels of the frames of the instants Ta and Tb. The estimated motion for each pel takes the shape of a vector D with two components, a horizontal component DX and a vertical component DY.

D designates the displacement between Ta and Tb of the pel P of coordinates (Z, Tj) in the ficititious frame Tj. Z represents the pair of coordinates, the horizontal coordinate IX and the vertical coordinate IY, of the pel in the fictitious frame Tj. Within this framework, the displacement vector D passes through the pel (Z, Tj) and has its ends on Ta and Tb while, previously, the displacement vector D(Z, Tp) corresponds to the displacement of the pel of coordinates (Z,Tb) between Ta and Tb. This difference has consequences for the definition of the equation (1) described above. This equation becomes:

$$Di(Z,Tj) = Di-1(Z,Tj) - TC \quad (24)$$

with $TC = (DFD(Z,Di-1).\text{grad } L(Z,Di-1))/2.(\text{grad } L(Z,Di-1))^2$ where: Z is a vector designating the spatial coordinates of the present pel P(Z, Tj) for which the motion vector D(Z, Tj) is estimated, Di(Z,Tj) is the estimated displacement vector at the pel P(Z, Tj) at the iteration i, DFD(Z, Di−1) designates the temporal difference in luminance in the displacement direction Di−1, still called "displaced frame difference" and computed between Ta and Tb according to the relationship;

$$DFD(Z, Di-1) = L(B, Tb) - L(A, Ta)$$

with $B = Z + ((Tb - Tj)/(Tb - Ta)) \times Di-1$ $A = Z - ((Tj - Ta)/(Tb - Ta)) \times Di-1$ grad L(Z, Di−1) is a vector designating the spatial gradient, which is the half sum of the spatial gradients at the endpoints of Di−1, on Ta and Tb. Its value is defined by:

2 grad L(Z, Di−1) = grad L(A, Ta) + grad L(BTp).

Compared with the equation (1), the equation (24) above is hardly different. It differs, however, in the computing of the functions DFD and grad L because the motion vector pivots around the pel (Z, Tj) and, consequently, its ends at the instants Ta and Tb frames vary while, in the method described earlier, the vector pivoted by one end around the pel P(Z, Tb) and had its other end free on the instant Ta frame. The result of this is that the advantages given by the estimating unit used by the method described earlier are preserved. Similarly, as regards the framework for the use of the basic equation, the strategies that continue to be meaningful in the present estimating unit are preserved. These are, in particular:

the estimation of the motion vector for the present pel following the recurrences examined in parallel and calculated from the four initializing vectors, namely the estimated motion vectors of the four pels neighbouring the present pel in the causal neighbourhood;

the alternating of the scanning direction of the line in the present frame (Tj) within the scope of the present invention;

the decision element relating to the choice of a displacement among four estimated displacements. However, the method which consists in comparing the gradient of the luminance of the present pel to a threshold, and in making a distinction between two procedures depending on whether this gradient is (strictly) greater or smaller than this threshold is eliminated. For this distinction no longer has any meaning since the luminance of the present frame Tj is unknown. All the pels of the fictitious frame Tj therefore follow the same procedure for estimating the motion vector according to four recurrences calculated in parallel. Furthermore, unlike the previous method, the estimate is calculated between two frames Ta and Tb, which may have the same parity or different parities, and for a frame Tj which may also be even-numbered or odd-numbered. A corrective vector, designated by dZa or dZb, is introduced into the computing of the functions DFD and grad L. dZa depends on the relative parity of Ta and Tj, while dZb depends on the relative parity of Tb and Tj.

The functions DFD and grad L become:

$$DFD = L(B+dZb, Tb) - L(A+dZa, Ta) \quad (25)$$

$$2 \times \text{grad } L(Z,Di-1) = \text{grad } L(B+dZb, Tb) - \text{grad } L(A+dZa, Ta) \quad (26)$$

Should the frame Tj considered be located outside the interval (Ta, Tb), the various equations presented above remain unchanged. In this case, the support of the vector D(Z, Tj) passes through the pel (P=Z,Tj) and this pel still measures the relative displacement between the instants Ta and Tb frames. To estimate the motion, the method of the invention uses the existing interframe differences between two instants Ta and Tb frame which may directly or indirectly follow one another in a sequence of pictures. In the following description, it is assumed that the displacement of each pel of the fictitious frame of an instant Tj is rectilinear between two frames at instants Ta and Tb, and each object element of the fictitious frame at the instant Tj (pel luminance) is also assumed to be present in the instants Ta and Tb frames. The method occurs in several steps, a schematic depiction of which is given in the flow chart of FIG. 13. According to a first step, shown at 61 in FIG. 13, each pel of the present frame is taken into consideration through a line scanning of all the pels of the frame. According to the method, the processing operations shown in the step 62 are performed to estimate four displacement values from four initial displacement values in the causal neighbourhood of the present pel. At the end of the execution of step 62, the method goes to the execution of the step 63 and a displacement is chosen from among the four displacements estimated in the step 62. The method thus takes place by successive iterations, with each end of execution of the step 63 causing the initialization of the following pel (step 64), and the displacements are recorded at the step 65. The displacement between the instants Ta and Tb frames is limited to values of ± DXmax in horizontal displacement and ± DYmax in vertical displacement. This means that the endpoints of each motion vector, passing through each pel (PZTj) of the present frame are located at instants Ta and Tb frames inside a rectangle which is respectively centered on the pels (Z, Ta) and (Z, Tb) with respective dimensions of 2x((Tj−Ta)/(Tb−Ta))×(Dxmax, DYmax) and 2x((Tb−Tj)/(Tb−Ta))x(Dxmax,DYmax), these latter terms depending respectively on the distance from Tj and Ta and Tj to Tb, relatively with respect to the instants Ta and Tb. To prevent the rectangle from leaving the context of the instants Ta and Tb frames, all the pels on the frame Tj for which a displacement vector is estimated, are included inside another rectangle, the center of which coincides with the center of the frame, and the dimensions of which are smaller than the dimensions of the frame of DXmax+2 columns and DYmax+2 lines (+2 is imposed by the computation of the spatial gradient). At this stage if a displacement vector is estimated for all the pels of the fictitious frame Tj, including the edges, a test may be added to ascertain that the endpoints of the vector are actually located on the instants Ta and Tb frames. If this is not so, it is easy to modify this vector so as to give the present pel a new vector, as close to the former one as possible, with its endpoints on the instants Ta and Tb frames so that the functions DFD and grad L can be estimated. The displacements estimated in the closest causal neighbourhood of the present pel served to initialize the motion-estimation algorithm. This causal neighbourhood contains four displacements which are used to initialize four estimates of motion in parallel. According to the method described earlier, the scanning direction is reversed alternately every other line. This scanning in alternating odd-numbered and even-numbered lines is shown in FIG. 14A. The pels A, B, C, D, the displacement vectors $D_O^A$, $D_O^B$, $D_O^C$ and $D_O^D$ of which are initial displacement vectors of Z, for the odd-numbered and even-numbered lines, are shown respectively in FIGS. 14B and FIGS. 14C. To perform the interpolation and computation of gradients in the prior frames, each displacement D=(DX, DY) is split up into its two components DX and DY according the relationships: DX=IDX+FDX and DY=IDY+FDY where ID and FD respectively designate the whole and fractional parts of the displacement. The unit of displacement in X is formed by the interval between two pels on the same line and the unit of displacement in Y consists of the interval between two lines in the same frame.

The gradients are calculated in the above-described way, and illustrated by FIG. 15 which represents a part of the instant Ta frame, and a displacement vector for which the endpoint on the instant Ta frame has the coordinates (Z−DA, Ta) and luminance LA. The luminance LB of its endpoint in the instant Tb frame and the displacement vector DB at this point are calculated in the same way.

In this case, the displacement vectors DA and DB check the relationships:

$$DA = ((Tj-Ta)/(Tb-Ta)) \times D$$

$$DB = ((Tb-Tj)/(Tb-Ta)) \times D$$

The vectors DA and DB are colinear and are such that $D = DA + DB$.

The luminance LA of the present pel displaced in the instant Ta frame is obtained by the bilinear interpolation of the luminances Ln of the neighbouring pels. This implies the following relationship with the notations of FIG. 15:

$$LA = I_9.(1-FDX).(1-FDY) + I_8.FDX.(1-FDY) + I_4(1-FDX).FDY + I_5.FDX.FDY$$

The spatial luminance gradient G at this pel, the components of which are marked GX and GY, is calculated as follows: If FDX is smaller than 0.2 and if FDY is smaller than 0.2 then:

$$GX = (I_{10} - I_8)/2$$

or if FDY is greater than 0.8, then:

$$GX = (I_3 - I_5)/2$$

$$GY = (I_9 - I_2)/2$$

or is included between 0.2 and 0.8 then:

$$GX = (I_{10} - I_8 + I_3 - I_4)/4$$

$$GY = (I_9 - I_2)/2$$

if FDX is greater than 0.8 and if FDY is smaller than 0.2 then:

$$GX = (I_9 - I_7)/2$$

$$GY = (I_{12} - I_5)/2$$

or if FDY is greater than 0.8 then:

$$GX = (I_4 - I_6)/2$$

$$GY = (I_8 - I_1)/2$$

or if FDY ranges between 0.2 and 0.8 then:

$$GX = (I_4 - I_6)/4$$

$$GY = (I_8 - I_1)$$

Finally if FDX ranges between 0.2 and 0.8 and if FDY is smaller than 0.2 then $$GX = (I_9 - I_8)$$

$$GY = (I_{11} - I_4 + I_{12} - I_5)/4$$

or if FDY is greater than 0.8 then $$GX = (I_4 - I_5)$$

$$GY = (I_9 - I_2 + I_8 - I_1)/4$$

or FDY ranges between 0.2 and 0.8 then $$GX = (I_4 - I_5 + I_9 - I_8/2$$

$$GY = .(I_9 - I_4 + I_8 - I_5)/2$$

Once the luminances LA and LB of the endpoints of the vector D at the instants Ta and Tb frames are determined, displaced frame difference is calculated by the relationship:

$$DFD(Z,D) = LP - LA$$

In the same way, once the spatial gradients GA and GB are determined at the endpoints of the vector D on the frames Ta and Tb, the gradient grad L(Z,D) of the recursive equation (1) is calculated by the relationship:

$$2 \times \text{grad } L(Z,D) = GA + GB$$

As in the method described previously, the risks of divergence of cancellation of the correction terms may be limited by increasing or decreasing these terms such that:

$$D^x_i = D_{i-1}^x - (\text{correction term in x})$$

$$D_i^y = D_{i-1}^y - (\text{correction term in y})$$

with (correction term in X) = DFD(Z,Di−1)x-$\text{grad}_x$(Z,Di−1) x epsilon
and (correction term in Y) = DFD(Z,Di−1)x-$\text{grad}_y$(Z,Di−1) x epsilon with epsilon = $\frac{1}{2}$x(gradL(Z,$D_{i-1}$))$^2$ (27)

and grad $L(Z,Di-1)^2 = \text{grad}^2_x L(Z,Di-1) + \text{grad}^2_y L(Z,Di-1)$ (28)

on condition that that if(gradL(Z,Di−1))$^2$ = 0
then the value of epsilon is zero.

In general, FDX and FDY are different from zero and the maximum precision on the gradient is 0.5

As in the case of the method described earlier, tests to limit the correction terms expressed in displacement units may be defined as follows:

1. If the absolute value of (correction term) is smaller than 1/16, then the (correction term) shall be taken to be equal to ±1/16.

2. If the absolute value of (correction term in x) is greater than 3, then the correction term in x will be taken to be equal to ±3.

3. If the absolute value of (correction term in y) is greater than 2, then the correction term in y will be taken to be equal to ±2. By way of example, it is also possible to take, in the case of two successive frames, a maximum displacement in x: DXmax = ±8 columns and a maximum displacement in y: DYmax = ±4 lines.

If the estimated displacement exceeds either of these values, it is reset at zero.

The maximum displacement Dmax between the instants Ta and Tb frames are split up into DAmax and DBmax, colinear vectors with their endpoints respectively at the instants Ta and Tj frames for DAmax, the instants Tb and Tj frames for DBmax such that Dmax = DAmax + DBmax. Since Dmax is fixed, DAmax and DBmax depend on the distance of the instant Tj frame from the instants Ta and Tb frames. The search zone in the instants Ta and Tb frames for a present pel P(Z,Tj) is then defined by a rectangle on each frame Ta and Tb having the following respective dimensions:

DXmax x((Tj−Ta)/(Tb−Ta)),DYmax x((Tj−Ta)/(Tb−Ta)) and

DXmax x((Tb−Tj)/(Tb−Ta)),DYmax x((Tb−Tj)/(Tb−Ta))

According to the method described previously, the four displacement estimations are done in parallel from the four initial values $D_O^A$ $D_O^B$ $D_O^C$ and $D_O^D$. A pel is considered to be convergent when at least one of the four displacement values $D_i^A$ $D_i^B$ $D_i^C$ and $D_i^D$ gives an absolute value of the displaced frame difference DFD(Z,Di) below a predetermined threshold S for an iteration number greater than or equal to zero (i=0 designating an intial value) and smaller than or equal to the maximum iteration number i max. If no displacement value gives a DFD value smaller than or equal to S, the pel is considered to be divergent but, all the same, it has a displacement assigned to it, namely that displacement, from among $D_{iMAX}^A$, $D_{iMAX}^B$, $D_{iMAX}^C$ and $D_{iMAX}^D$, which gives the absolute value of the smallest displaced frame difference DFD.

At each iteration (from 0 to imax) the method gives four values of DFD (Di) which are compared with the threshold S.

The displacement retained is the first which gives the DFD value smaller than or equal to the threshold S. If several displacements are obtained at the same iteration, the one that gives the smallest displaced frame difference DFD is chosen. If there is again equality in the value of DFD, an arbitrary choice is made in the following order:

$D_i^A$ $D_i^B$ $D_i^C$ and $D_i^D$.

Thus, with each iteration i from the value i=0 up to a value imax, there are the following associated: a displacement Di, a displaced frame difference DFD and an iteration number i.

The decision is taken on the smallest number of iterations and then on the minimum displaced frame difference DFD and then, as the case may be, according to an arbitrary choice.

Figure 20:
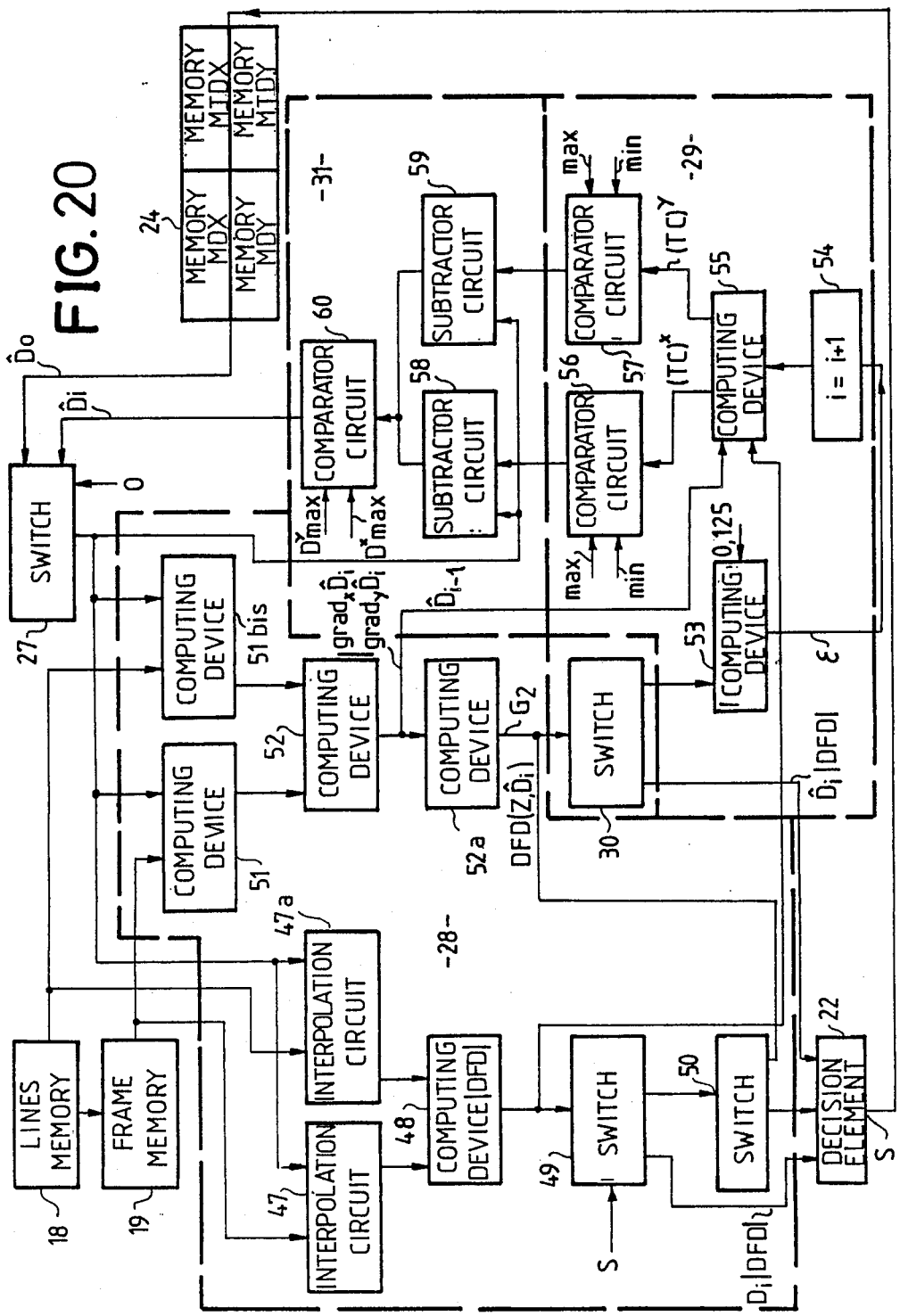
FIG. 20 is a detailed block diagram of a displacement estimating device of FIG. 19.

The modifications to be made to the device described in FIGS. 8, 9 and 11 are shown in FIGS. 17, 18 and 20, with similar elements in these figures bearing the same references.

The device shown in FIG. 17 comprises a set of line memories 18, a frame memory 19, a scanning direction determining device 20, a displacement estimating element 23, a decision element 22 and a motion vector initializing element 24. The displacement estimating device has two inputs which are connected, firstly, to the output of the frame memory 19, and secondly, to the output of the line memory 18. Each of the line memories 18 acts as a buffer for the frame memory 19 to store refresh data for this frame memory 19 pending the stage when the analyzed pels are outside the exploration window. As an indication, with an exploration window of the type shown in FIG. 16, occupying, for example, a space of 8 lines, a line memory with a pel-storing capacity corresponding to 10 successive lines would appear to be quite sufficient. The computations are done at the pel frequency, at the rate of the clock pulses, H1 and Hk, given by a line clock (not shown). The scanning direction determining device 20 determines the present line number 1 and, depending on the parity of this present line number 1, it determines the present pel column number k. It thus has the coordinates (k,1) of the present pel available to it. The decision element 22 has the functions described in FIG. 18 and can be made in a known way, either with a microprocessor-type microprogrammed structure or with a wired logic circuit obtained, in a known way, through comparator circuits.

The displacement estimating device shown in FIG. 18 consists, in a manner similar to the device shown in FIG. 9, of an initializing block 24 consisting of registers 25 and 26 and a computing unit 23 made up of the elements 27 to 46. The computing unit 23 gives the displacement data $D_i^A$, $D_i^B$, $D_i^C$, $D_i^D$ to the decision element 22. The initializing block 24 has a first register 25 and a second register 26. These registers consist of two distinct parts, on representing the displacement mode in x or in y, respectively called MDX and MDY, and the other to act as a buffer memory for the displacement modes MTDX and MTDY computed by the decision element 22.

If NC designates the number of pels for which a motion is estimated at each line, we get:
MDX=(NC+2) displacements
MDY=(NC+2) displacements
MTDX=1 displacement
MTDY=displacement At the start of each picture frame, all words MDX, MDY, MTDX and MTDY are reset at zero. MTDX and MTDY are used as intermediaries before overlaying the words MDX and MDY contained in the registers 25 and 26, corresponding to the displacements D(k−1,1−1), for proceeding to the analysis of the following pel (k+1,1) as shown in FIG. 19A. They also serve as intermediaries before overlaying the words MDX and MDY, contained in the registers 25 and 26, corresponding to the displacements D(k+1,1−1) for proceeding to the analysis of the following pel (k−1,1) as shown in FIG. 19B.

In the case of FIG. 19A when k is equal to FC, the last pel of the line to have an estimated motion, the estimated displacement D(FC,1) is placed in the words (MDX, MDY) corresponding to the displacement D(FC,1). Simultaneously, a new displacement is calculated as follows:

D(FC+1, L+1)=(D(FC,L)+D(FC−1,L)+D(FC−2,L)+D(FC−3,L2))/4. This displacement is registered in the word (MTDX, MTDY). It constitutes the initial displacement $D_O^A$ of the next displacement to be estimated D(FC, L+1).

Similarly, in the case of FIG. 19B, when k is equal to DC, the last pel of the line to have an estimated motion, the corresponding displacement D(DC,L) is registered in the words (MDX, MDY) corresponding to the displacement D(FC,L). Simultaneously, a new displacement is calculated as follows:

D(DC+1, L+1)=(D(DC,L)+D(DC+1,L)+D(DC+2,L)+D(DC+3,L2))/4.

As in the example of the device of FIG. 9, the displacement estimation computing device of FIG. 18, consisting of the elements 27 to 46, does four parallel displacement computations from four initial values $D_O^A$, $D_O^B$, $D_O^C$, $D_O^D$ contained in the initializing block 24. The four initial values are respectively applied to the first inputs of switching circuits 27, 32, 37 and 42, the outputs of which are connected to convergence-testing and correcting-term computing blocks respectively marked (28, 29), (33, 34), (38, 39), and (43, 44). The results of the convergence tests and of the computation of the correcting terms are applied to the inputs of switching devices, respectively marked 30, 35, 40 and 45 which then direct them either to respective inputs of the decision element 22 or to devices for computing new displacements, respectively marked 31, 36, 41 and 46, when the solution of the earlier-described algorithm deviates for i lower than i max. The new displacements given by the computing devices 31, 36, 41 and 46 are respectively applied to the second inputs of switching devices 27, 32, 37 and 42.

The details of an embodiment of a convergence-testing block 28, associated with a correcting-term computing block 29 and a new displacement computing block 31, are shown in FIG. 18 within broken lines.

Unlike the device of FIG. 11, the convergence-testing block 28 of FIG. 20 includes, firstly, two interpolation circuits 47 and 47a, coupled to a device 48 for computing the absolute value of the displaced frame difference DFD, this device 48 being coupled to the decision element 22 through switches 49, 50 and, secondly, two gradient-computing devices 51 and 51b, coupled to a device 52 for computing the displaced mean gradients. This device 52 is itself connected to a device 52a for computing the sum of the squares of the displaced mean gradients. The interpolation circuit 47, which may consist of a programmable read-only memory, is also coupled to the frame memory 19. The interpolation circuit 47a, which may also consist of a read-only memory, is connected to the lines memory 18. The correcting-terms computing block 29 has a computing device 53 to compute the above-described correction value epsilon, coupled to an increment-computing device 54 and a correction values computing device 55 as well as comparator circuits 56 and 57.

The new displacements computing block 31 had subtracting circuits 58 and 59, both coupled to a comparator circuit 60. The convergence-testing block 28 and the correcting-term computing block 29 are coupled, as in FIG. 18, by the switch 30. The input of the switch is directly coupled to the output of the computing device 52 and to the output of the computing device 48, through switches 49 and 50. Furthermore, as in FIG. 9, the initializing block 24 is coupled to the convergence-testing block 28 through the switch 27. This switch connects the initializing block 24, firstly, to a first input of the interpolation circuit 47s 47 and 47a and, secondly, to a first input of the computing devices 51 and 51b. The second input of the switch 27 is also coupled to the output of the new displacement computing block 31, which consists of the comparator circuit 60.

The displacement estimating device works as follows. For each of the present pels of the picture, the switch 27 transmits an initial displacement value Do, found in the register 24, to the interpolation circuits 47 and 47a and the gradient-computing devices 51 and 51a. The value Do initializes the estimation. A bilinear interpolation on the value Do is computed, firstly by the interpolation circuit 47 to determine the luminance L(Z−Dox(Tj−Ta)/(Tb,Ta), of the present pel (Z,Tj) displaced in the prior instant Ta frame with the value Do×(Tj−Ta)/(Tb−Ta) and, secondly, by the interpolation circuit 47a to determine the luminance L(Z+Do(Tb−Tj)/(Tb−Ta),Tb) of the same present pel which displaced, this time, in the following frame Tb with the value Do x(Tb−Tj)/(Tb−Ta).

The displaced frame difference DFD(Z,Do) and its absolute value are computed by the computing device 48. The switch 49 sends the value computed by the computing device 48 to the decision element 22 when the value obtained is smaller than or equal to the above-defined threshold S. The displacement Do and absolute value of the displaced frame difference DFD(Do) are applied to the inputs of the decision element. Otherwise, the result given by the computing device 48 is applied to the input of the switch 50 and then to the input of the decision element 22 when the iteration value i is equal to the maximum iteration value i max. On the contrary, when the iteration value i is smaller than the maximum value, the result given by the computing device 48 is applied to the inputs of the correction computing block 29 through the switch 30.

During these computing operations, which are performed during a time T from the instant t=0, the gradients at the present pel displaced in each instant Ta and Tb frame, (grad Xa, grad Ya) and (grad Xb, grad Yb) are computed in parallel in the devices 51 and 51a. Then, the gradient values grad X and grad Y determined by the relationships:

$$2 \times gradX = gradXa + gradXp$$

$$2 \times gradY = gradYa + gradYp$$

are computed by the device 52. The computing device 52a then computes a term of the type $G_2 = 2 \times (grad^2 X + grad^2 Y)$ according to the relationship (28) mentioned above.

The relative parities of the instants Ta and Tj frames are taken into account in the circuits 47 and 51 and the relative parities of the instants Tb and Tj are taken into account in the circuits 47a and 51a.

Depending on the value of G2, the switch 30 sends the result obtained either towards the decision element 22, if the value of G2 obtained is smaller than or equal to a coefficient value of 0.125 for example, or to the computing block for correcting terms of new displacements 29 and 31.

The computing device 53 computes the value epsilon=1/G$_2$ defined earlier. The iteration value i is increased by one unit by the increment computing device 54 and is reset at zero for the analysis of the following present pel. The terms $(TC)^x$ and $(TC)^y$ for correction in X and Y are computed by the circuit 55. The values $(TC)^x$ and $(TC)^y$, obtained at the outputs of the computing device 55, verify the relationships:

$$(TC)^x = DFD(z,Di) \times grad_x(Di) \times epsilon$$

and $$(TC)^y = DFD(Z,Di) \times grad_y(Di) \times epsilon.$$

The values $(TC)^x$ and $(TC)^y$ obtained are respectively applied to the inputs of the comparators 56 and 57 to be limited (barring plus or minus signs) to maximum and minimum values. According to a preferred embodiment of the invention, the minimum values of $(TC)^x$ and $(TC)^y$ are the same and are fixed at 1/16. On the contrary, the maximum value of $(TC)^x$ is fixed so as to be equal to 3 and the maximum value of $(TC)^y$ is fixed so as to be equal to 2. The terms $(TC)^x$ and $(TC)^y$ obtained are added to the displacement values $D_o^x$ and $D_o^y$ by the circuits 58 and 59, and the results obtained $D_1^x$ and $D_1^y$, which correspond to the estimated displacements, are again limited by the comparator circuit 60 before being applied to the second input of the switch 27. At the following iteration i(i=2), the switch 27 applies the estimated displacements $D_1^x$ and $D_1^y$ to the circuits 47, 51, 58 or 59.

At the output of the decision element 22, a displacement is chosen for the present pel and is written in the zones MTDX and MTDY of the buffer memory 24. The iteration value i is reset at zero, the switch 27 returns to its starting position, and the computations described above are started again to estimate the displacement of the new present pel.

What is claimed is:

1. A method to estimate motion in a sequence of television type moving pictures, where each picture is formed by a determined number of light spots located at intersections of lines and columns, said method of the type where motion is estimated by performing a gradient algorithm which minimizes a mean square deviation between local variations in luminance of a current pel of the picture and those of a pel in a similar position to the current pel in the prior image, said method comprising the steps of:

initializing an algorithm by displacement values estimated according to several directions within a close causal neighborhood of the current pel and of the propagation of each estimate in a scanning direction of picture lines, choosing a propagating direction for the algorithm depending on a position, in the picture, of a line to which the current pel belongs, calculating a modulus of a gradient of the current pel and comparing the result with a pre-determined threshold value, choosing a displacement for the present pel in the causal neighborhood of this pel when the modulus of the gradient obtained is below the pre-determined threshold value, and choosing the displacement that gives the smallest displaced frame difference, or estimating a new displacement when the gradient modulus obtained is above the predetermined threshold.

2. A method according to claim 1 wherein the scanning direction alternates every other line.

3. A method according to claim 1 further comprising the steps when the gradient modulus obtained is above the pre-determined threshold, computing a simultaneous estimating computation for a determined number N of displacements, from N initial displacement values, and choosing the displacement value $D_i(0 < i < _{MAX})$ which gives a convergence with the smallest displaced frame difference DFD(Di).

4. A motion-estimating method according to claim 1 wherein a field of motion is determined between two successive frames (Ta, Tb) of a sequence of pictures, in the form of a vector field assigned to a fictitious picture frame (Tj) located in the vicinity of the two frames (Ta, Tb).

5. A method according to claim 4 wherein the scanning direction of the fictitious frame lines is alternated at every other line.

6. A method according to claim 4 wherein the motion of each pel in the fictitious frame Tj is estimated in the form of a motion vector D(Z,Tj), corresponding to the displacement of the pel P(Z,Tj) between the instants Ta and Tb frames, this vector passing through the present pel P(Z,Tj) and respectively having its endpoints on the instants Ta and Tb picture frames, the estimation taking place by the performance of a computation through the iteration of displacement vectors Di(Z,Tj), according to a gradient algorithm which minimizes the mean square deviation of the local luminance variations of the present pel in the instant Tj fictitious frame.

7. A method according to claim 6 wherein each displacement vector Di(Z,Tj) of an iteration i is obtained from the displacement vector Di−1(Z,Tj) obtained at the preceding iteration i-1 by the relationship:

$$Di(Z,Tj) = Di-1(Z,Tj) - (DFD(Z,Di-1).\text{grad } L(Z,Di-1))).(2.(\text{grad } L(Z,Di-1))^2)1.$$

where: Z designates the spatial coordinates of the present pel P(Z,Tj) for which the motion vector D(Z,Tj) is estimated;

DFD(Z,Di−1) designates the computed displaced frame difference between the instants Ta and Tb frames;

and grad L (Z,Di−1) designates the spatial gradient which is the half-sum of the spatial gradients at the endpoints of the displacement vector Di−1 on the instants Ta and Tb frames.

8. A method according to claim 7 wherein the estimation of the motion vector D(Z,Tj) for the pel P(Z,Tj) is computed from the four initializing shift vectors corresponding to the motion vectors already estimated for four neighbouring pels in the causal neighbourhood of the present pel and, with the four initializing shift vectors giving rise to four estimated motion vectors, only that motion vector is chosen, out of these four estimated vectors, which gives a convergence of the gradient algorithm with the smallest frame difference.

9. A method according to claim 8 wherein the displaced frame difference DFD (Z,Di−1) is obtained by taking the temporal difference in the displacement direction Di−1 of the luminance values of the present pel P(Z,Tj) displaced in the instants Ta and Tb frames.

10. A method according to claim 9 wherein the luminance values LA and LB of the displaced pel in the instants Ta and Tb frames respectively, are obtained by the bilinear interpolation of the luminance values Ln of the four pels surrounding the pel, at the endpoint of the vector considered, in Ta and Tb respectively.

11. A method according to claim 10 wherein each displacement vector Di is obtained by subtracting the displacement vector Di−1, calculated at the preceding iteration, from a correcting term equal to the product of the displaced frame difference DFD(Z,Di−1), firstly, by the spatial gradient of luminance grad L(Z,Di−1) and, secondly, by the converse of the half-sum of the spatial gradients at the endpoints of the displacement vector Di−1 on the instants Ta and Tb frames.

12. A device for the application of the method according to claim 11 comprising a line memory coupled to a frame memory to store, respectively, luminance values of a determined number of pels surrounding the pels homologous with the present pel P(Z,Tj) and the pels that surround it in the instants Ta and Tb frames, a displacement estimating device coupled with the line memory, with the frame memory and with a decision element to compute, from the luminance values of the pels contained in the line memory and the frame memory and from at least one initial displacement value contained in an initializing block, a displacement vector for each present pel P(Z,Tj) of the picture.

13. A device according to claim 12 wherein the displacement estimating device comprises at least one convergence-testing block, one correcting-term computing block and one new displacement computing block.

14. A device according to claim 13 wherein a convergence-testing block comprises, firstly, a first interpolation circuit to determine the luminance of the present pel displaced in the instant Ta frame, a second interpolation circuit to determine the luminance of the current pel displaced in the instant Tb frame and a computing device coupled to the first and second interpolation circuits to compute, according to the luminance values computed by the first and second interpolation circuits, the absolute value of the displaced frame difference, the output of the computing device being coupled with the decision element through a first switch and a second switch; said convergence-testing device comprising, secondly, first and second gradient computing devices coupled to a third device for computing the mean of the gradients formed by the first and second computing devices, the third computing device being coupled to a fourth device to compute the sum of the squares of the displaced mean gradients.

15. A device according to claim 14 wherein a correcting-terms computing block comprises a fifth device to compute an "epsilon" value equal to the converse, divided by two, of the sum of the squares of the displaced mean gradients given by the fourth computing device coupled, through an increment computing device, to a correction computing device coupled, firstly, to the third computing device, and secondly, to the second switch to compute correcting terms depending on the absolute value of the displaced frame difference given by the computing device and on the "epsilon" value, as well as at least one comparator circuit to limit the value of the correcting terms obtained from the correction computing device.

16. A device according to claim 15 wherein a new displacements computing block comprises subtractor circuits to subtract the correcting terms, at each new iteration commanded by the increment computing device, from the displacement value calculated at the preceding iteration and stored in the initialization block to obtain the new dispacement values at each new iteration and store them in the initialization block.

17. A device for implementation of a method to estimate motion in a sequence of television type moving pictures, where each picture is formed by a determined number of light spots located at intersections of lines and columns, of the type where motion is estimated by performing a gradient algorithm which minimizes a mean square deviation between local variations in luminance of a current pel of the picture and those of a pel which is homologous to it in the prior image, where the method includes the steps of initializing an algorithm by displacement values estimated according to several directions within a close causal neighborhood of the current pel and of the propagation of each estimate in a scanning direction of picture lines, choosing a propagating direction for the algorithm depending on a position, in the picture, of a line to which the current pel belongs, calculating a modulus of the gradient of the current pel and comparing the result with a pre-determined threshold value, choosing a displacement for the present pel in the causal neighborhood of this pel when the modulus of the gradient obtained is below the pre-determined threshold value, and choosing the displacement that gives the smallest displaced frame difference, or estimating a new displacement when the gradient modulus obtained is above the pre-determined threshold, said device comprising:

a picture memory to store the luminance values of a determined number of pels surrounding the pel of P(z,t−1) of a coordinate z in the picture homologous with the current pel P(z,t) in the picture frame $IMS_{(t-1)}$ preceding the current pel frame $IMS_{(t)}$, a device to compute the modulus of the luminance gradient of the current pel, a first decision element and a second decision element, a displacement estimating device, and a switching device, the outputs of the two decision elements being coupled to elements of the switching device controlled by the gradient modulus computing device, said switching device controlled such that if the value of the current gradient modulus is smaller than or equal to a pre-determined threshold value, the displacement chosen is the one coming from the second decision element, otherwise, the displacement chosen is the one coming from the first decision element.

18. A device according to claim 17 wherein the displacement estimating device comprises an initializing block to store the initial displacement along several directions, coupled to a computing unit to compute, from initial displacement values, displacement values for which the gradient algorithm converges.

19. A device according to claim 18 wherein the computing unit is coupled to the decision element to select the displacement value that gives the fastest algorithm convergence.

20. A device according to claim 19 wherein the computing unit comprises, for each estimated displacement value $D_i(0<i<i_{MAX})$, a convergence-testing block coupled with a correcting-terms computing block and a new displacements computing device.

21. A device according to claim 20 wherein the convergence-testing block comprises, firstly, an interpolation circuit coupled with a device for computing the absolute value of the displaced frame difference and, secondly, a gradient computing device coupled with a device for computing the sum of the squares of the displaced gradients, obtained along both the horizontal and the vertical picture-scanning directions.

22. A device according to claim 21 wherein the correcting-terms computing block comprises a device to compute the gain of the gradient algorithm, coupled with a device to compute increment and correction values.

23. A device according to claim 22 wherein the new displacements computing device has subtractor circuits to compute displacement values according to the correcting terms computed by the correcting-terms computing block.

24. A device according to claim 23 wherein each correcting term (TC) given by the correcting-terms computing block is equal to the product of the displaced frame difference $DFD(Z,D)$ by the value of the displaced pel gradient $P(Z-D,T-1)$ and by the gain of an algorithm epsilon, D being an estimated displacement at the current pel.

* * * * *